Figure 20:
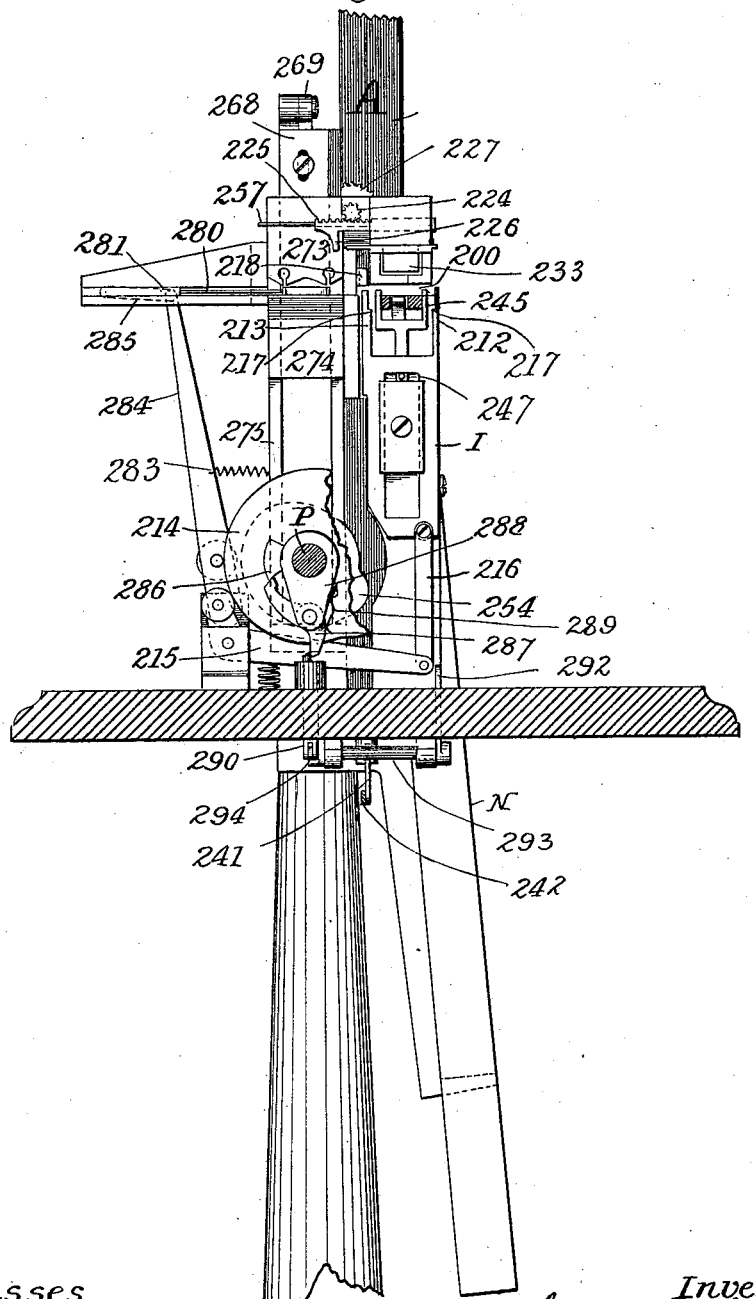

No. 607,045. Patented July 12, 1898.
F. A. JOHNSON.
TYPE SETTING AND JUSTIFYING MACHINE.
(Application filed Sept. 18, 1895.)
(No Model.) 18 Sheets—Sheet 1.
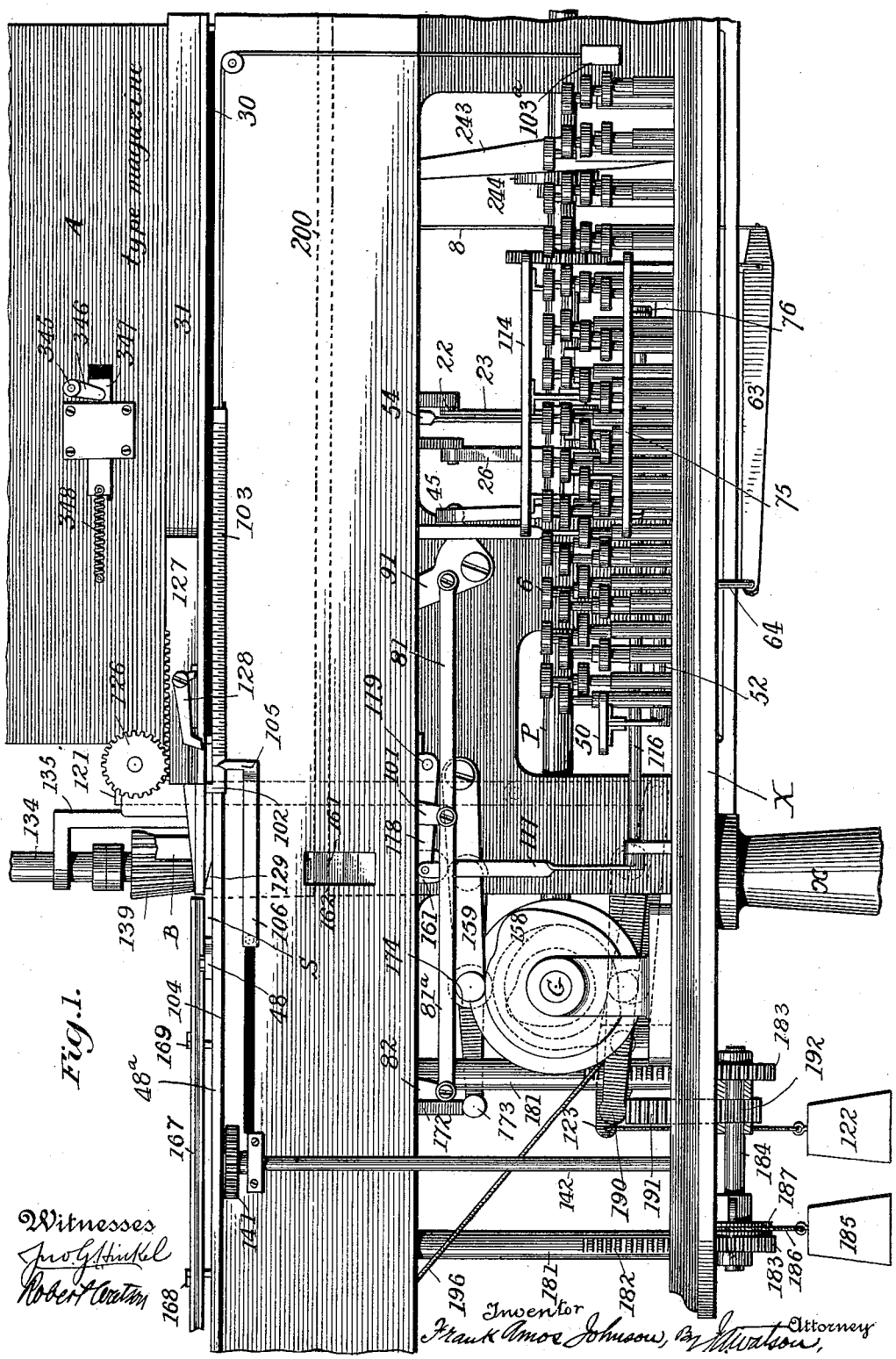

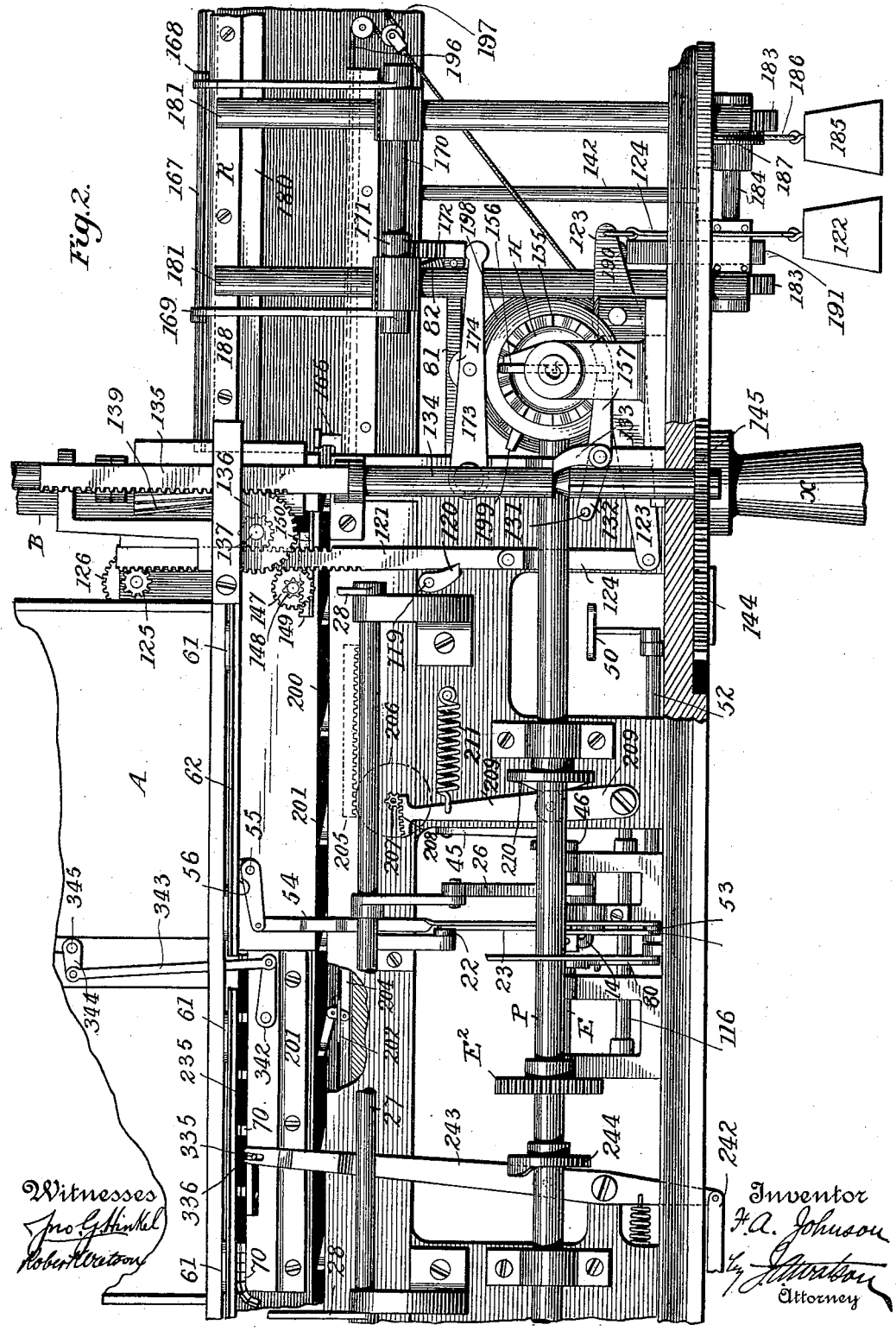

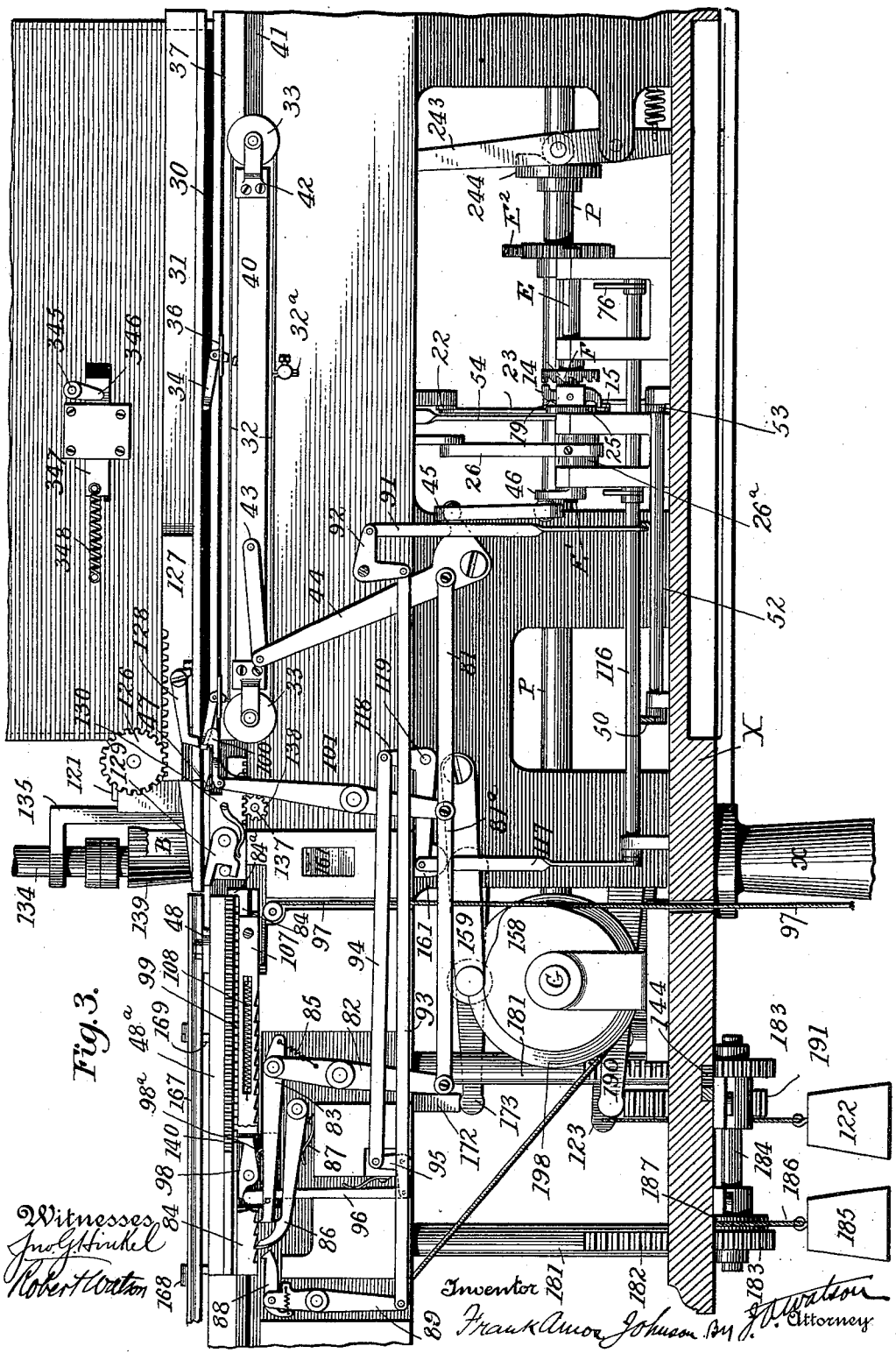

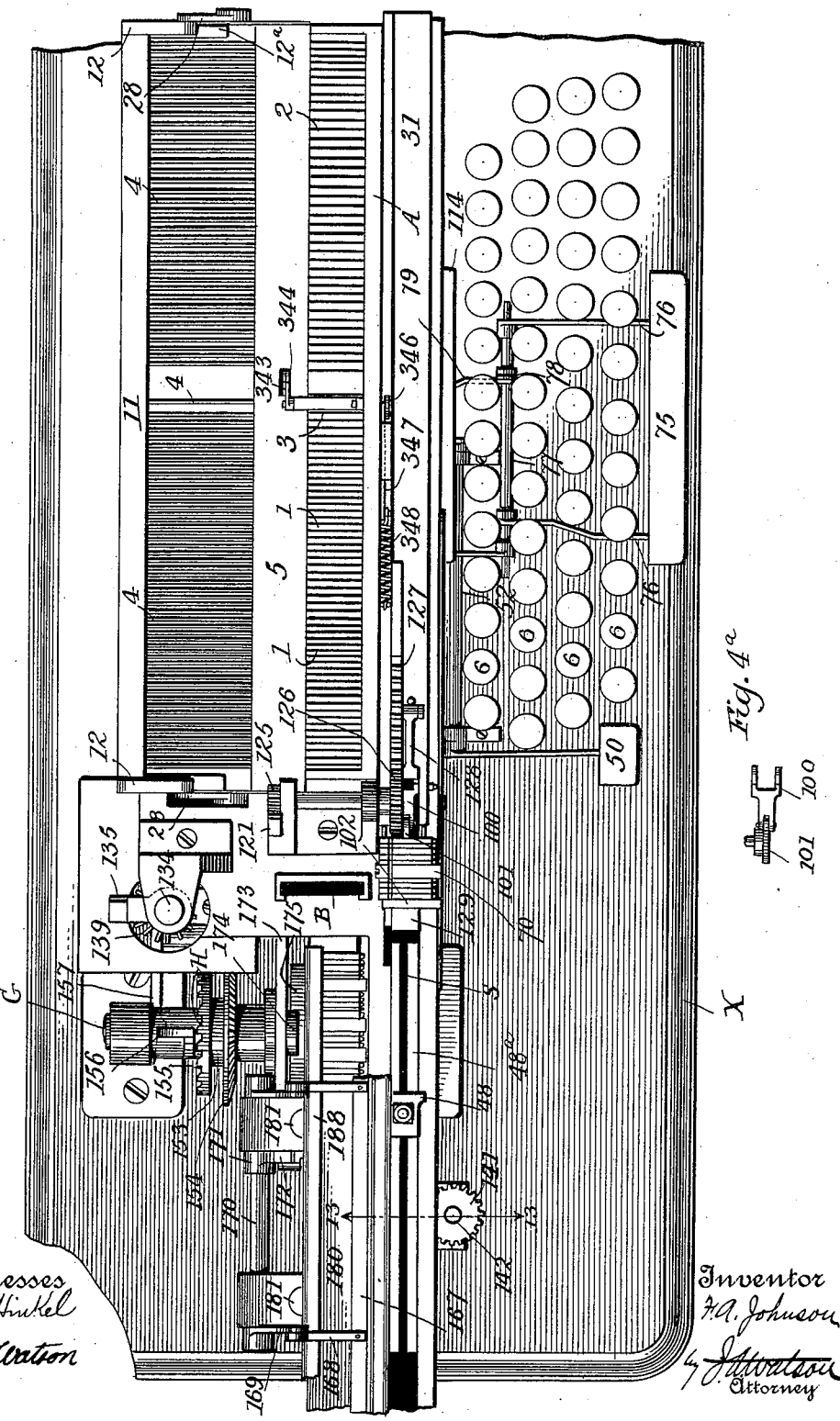

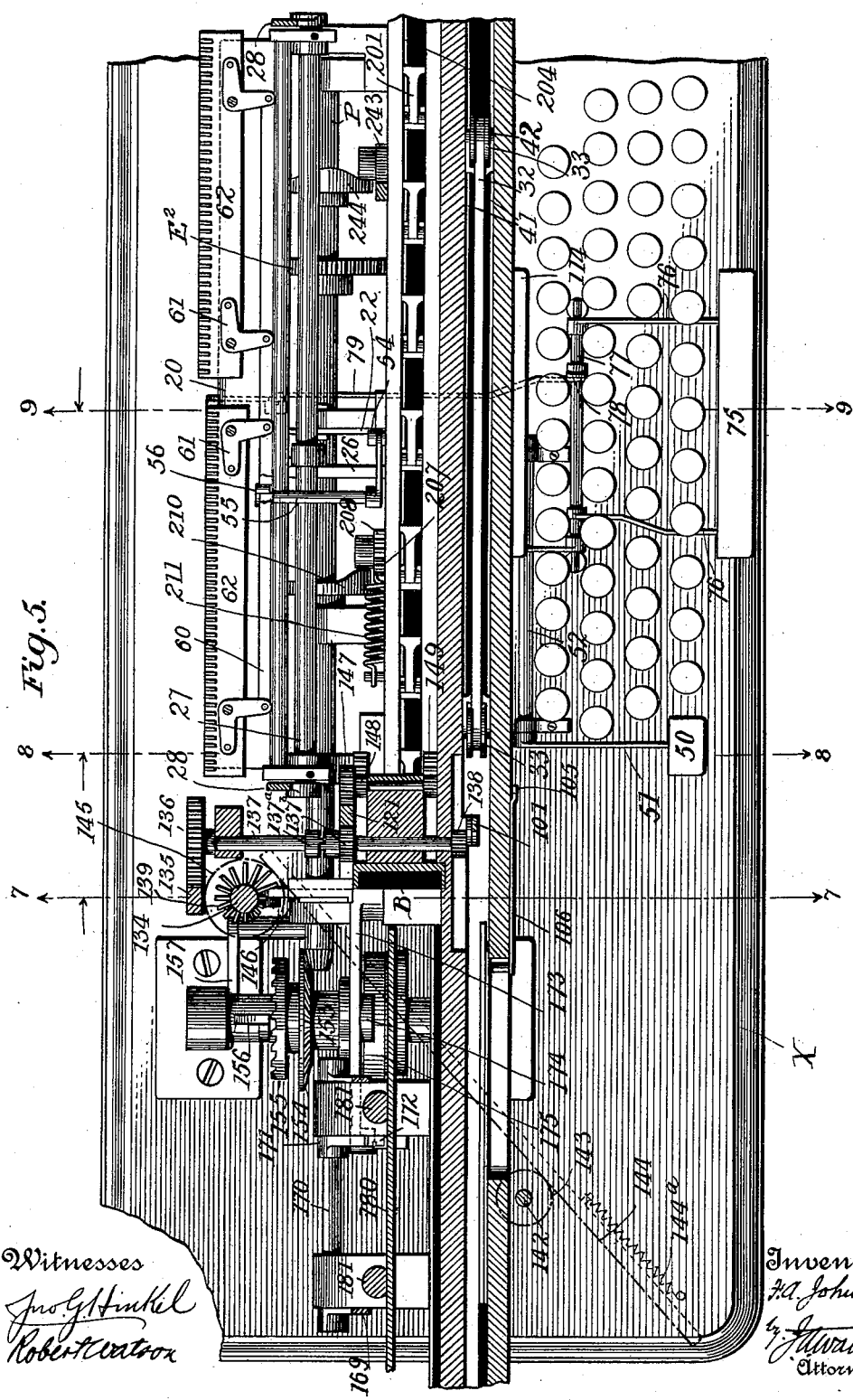

No. 607,045. Patented July 12, 1898.
F. A. JOHNSON.
TYPE SETTING AND JUSTIFYING MACHINE.
(Application filed Sept. 18, 1895.)
(No Model.) 18 Sheets—Sheet 6.
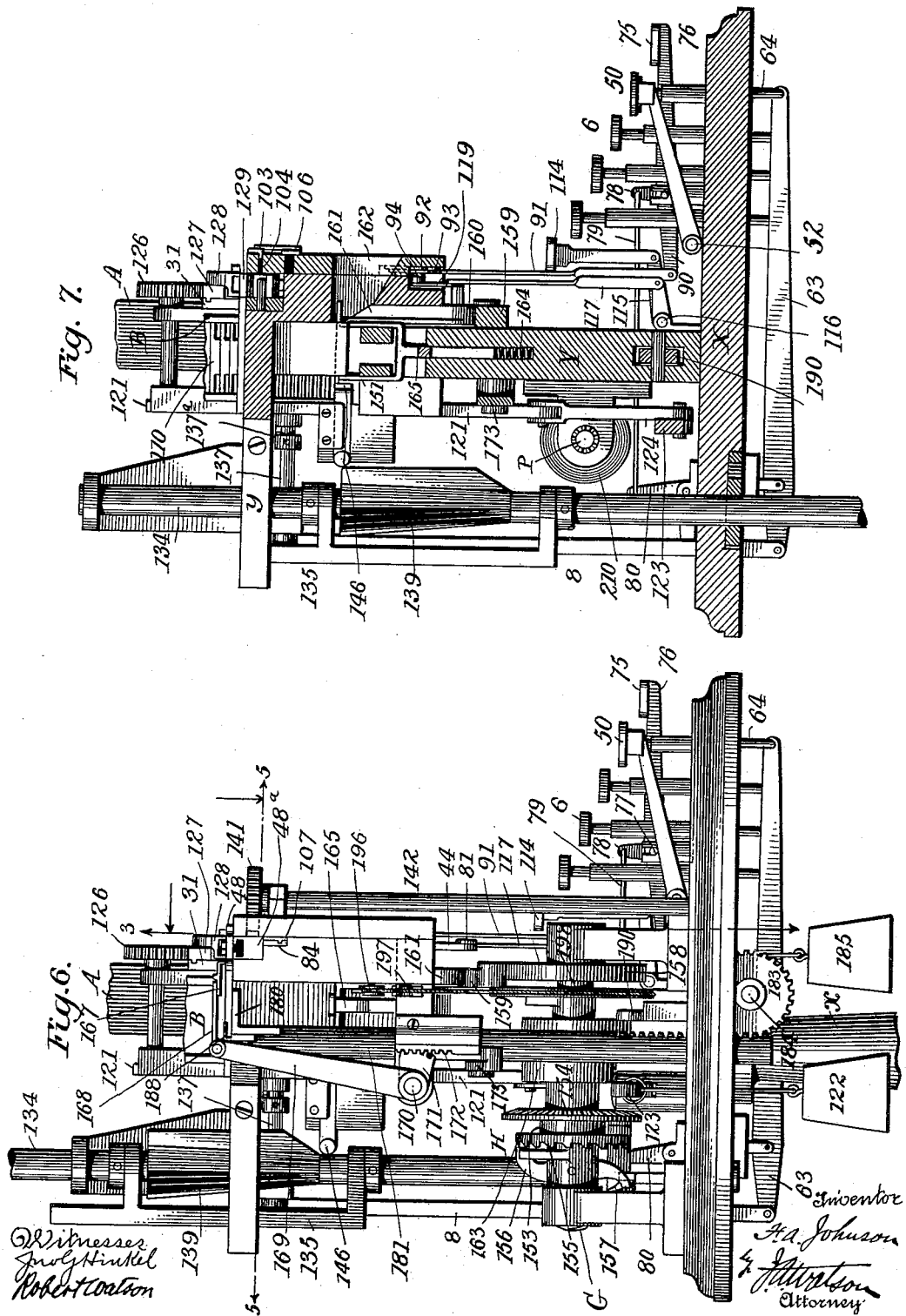

No. 607,045. Patented July 12, 1898.
F. A. JOHNSON.
TYPE SETTING AND JUSTIFYING MACHINE.
(Application filed Sept. 18, 1895.)
(No Model.) 18 Sheets—Sheet 7.
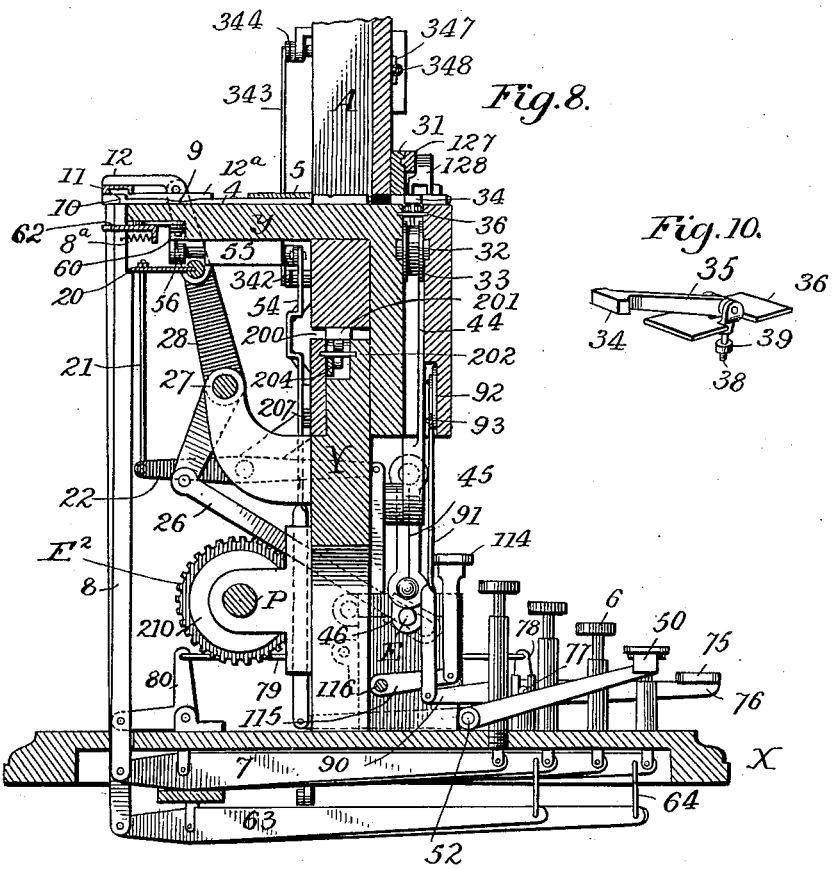
Fig. 8.
Fig. 10.
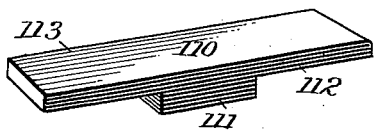
Fig. 25.
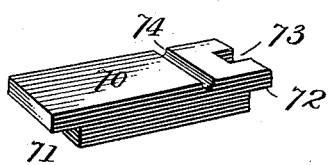
Fig. 24.
Witnesses
Jno G Hinkel
Robert Watson
Inventor
Frank Amos Johnson
by J. H. Watson
Attorney

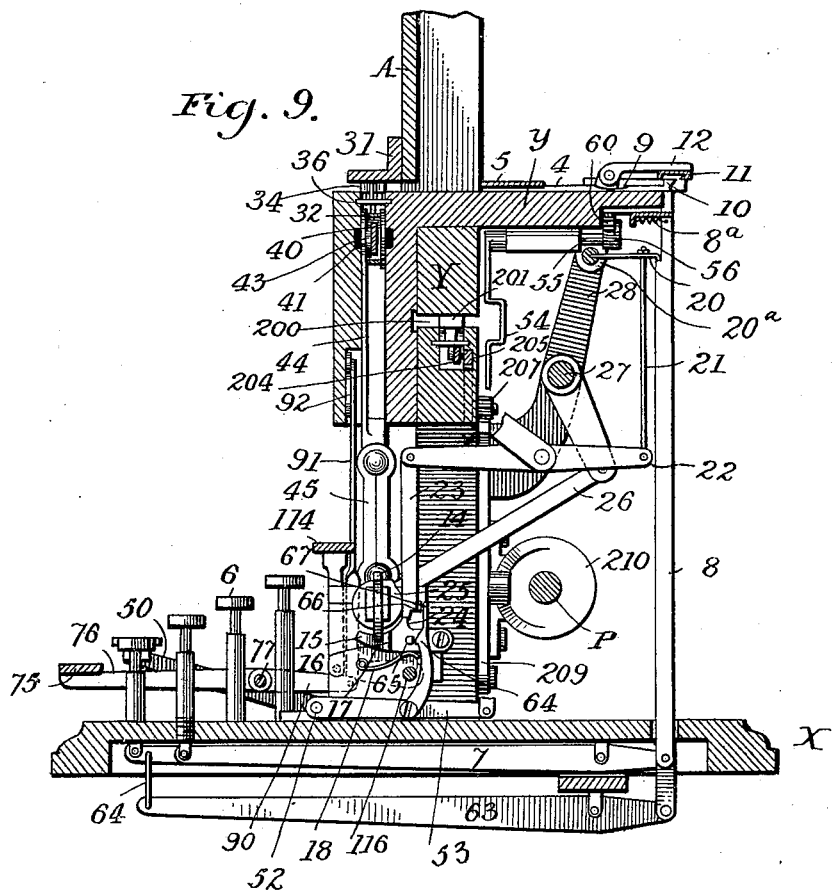

No. 607,045. Patented July 12, 1898.
F. A. JOHNSON.
TYPE SETTING AND JUSTIFYING MACHINE.
(Application filed Sept. 18, 1895.)
(No Model.) 18 Sheets—Sheet 9.
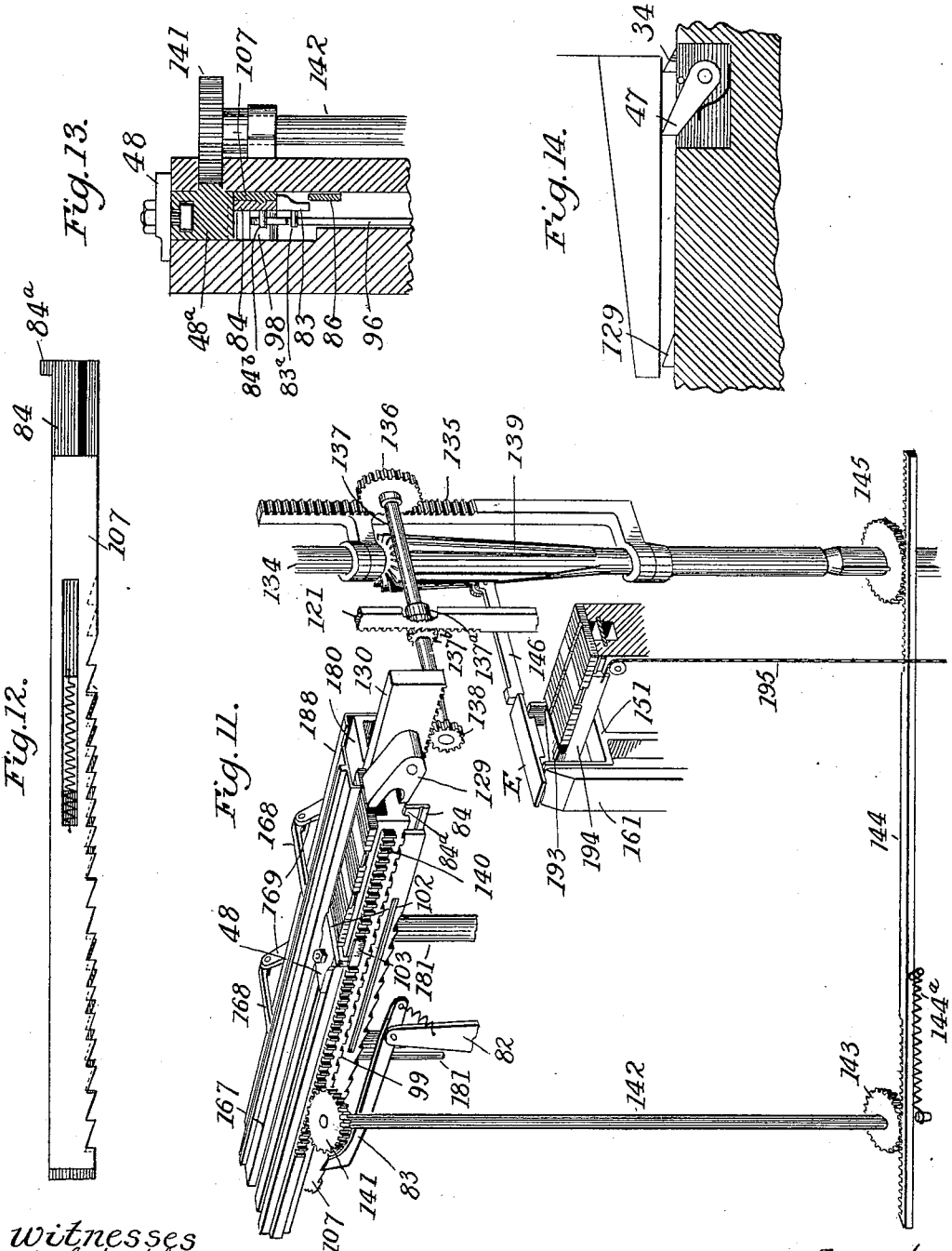
Witnesses
Inventor
Frank Amos Johnson No. 607,045. Patented July 12, 1898.
F. A. JOHNSON.
TYPE SETTING AND JUSTIFYING MACHINE.
(Application filed Sept. 18, 1895.)
(No Model.) 18 Sheets—Sheet 10.
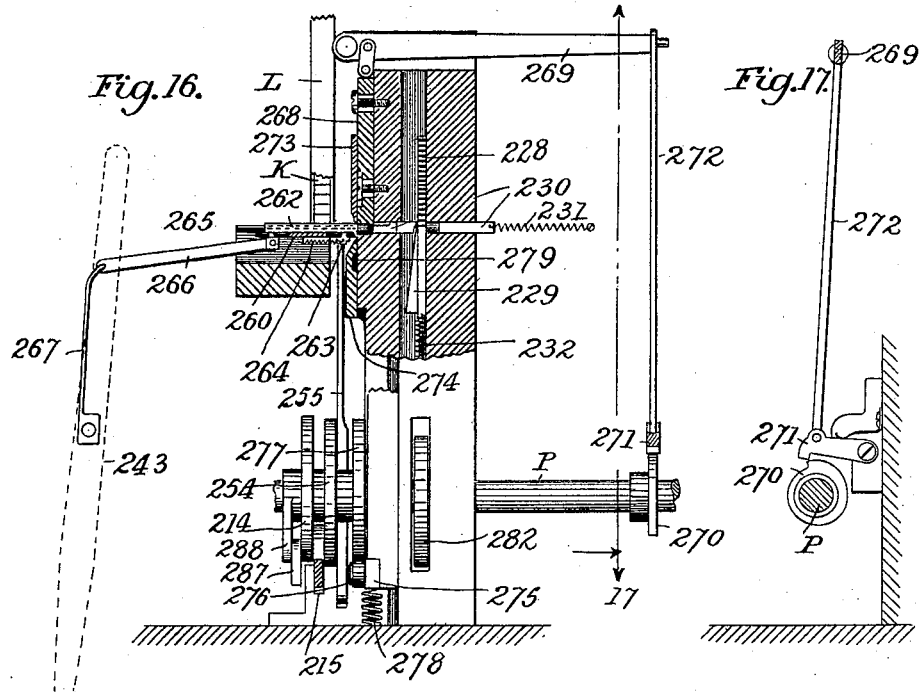
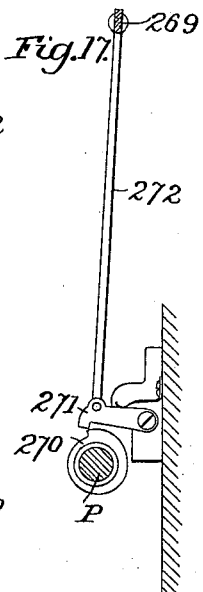
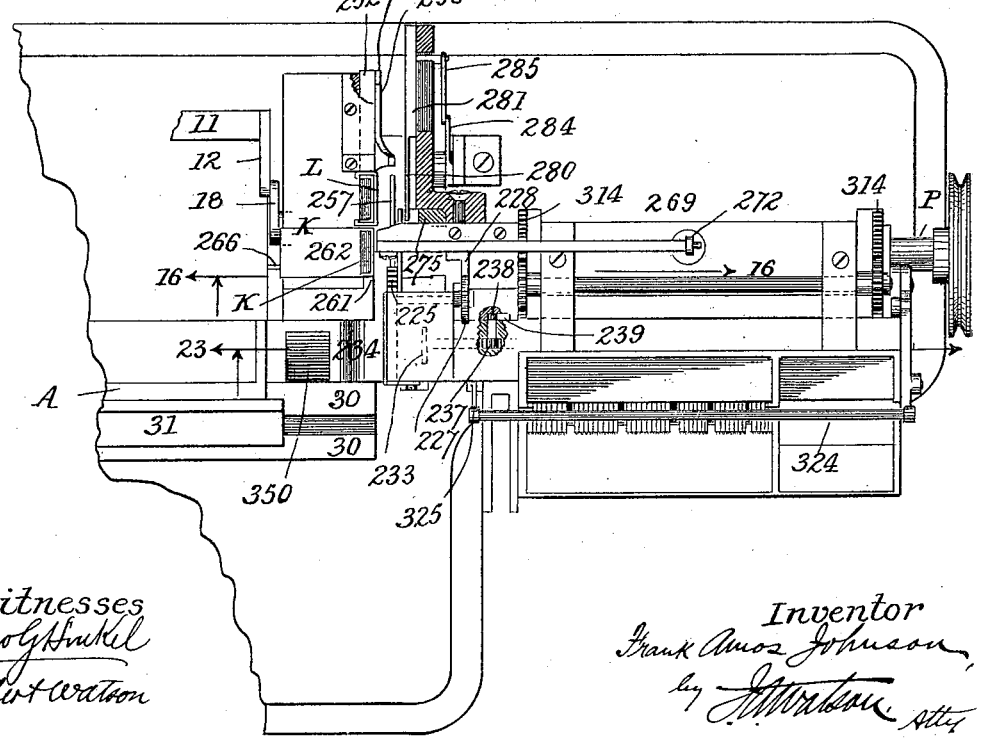

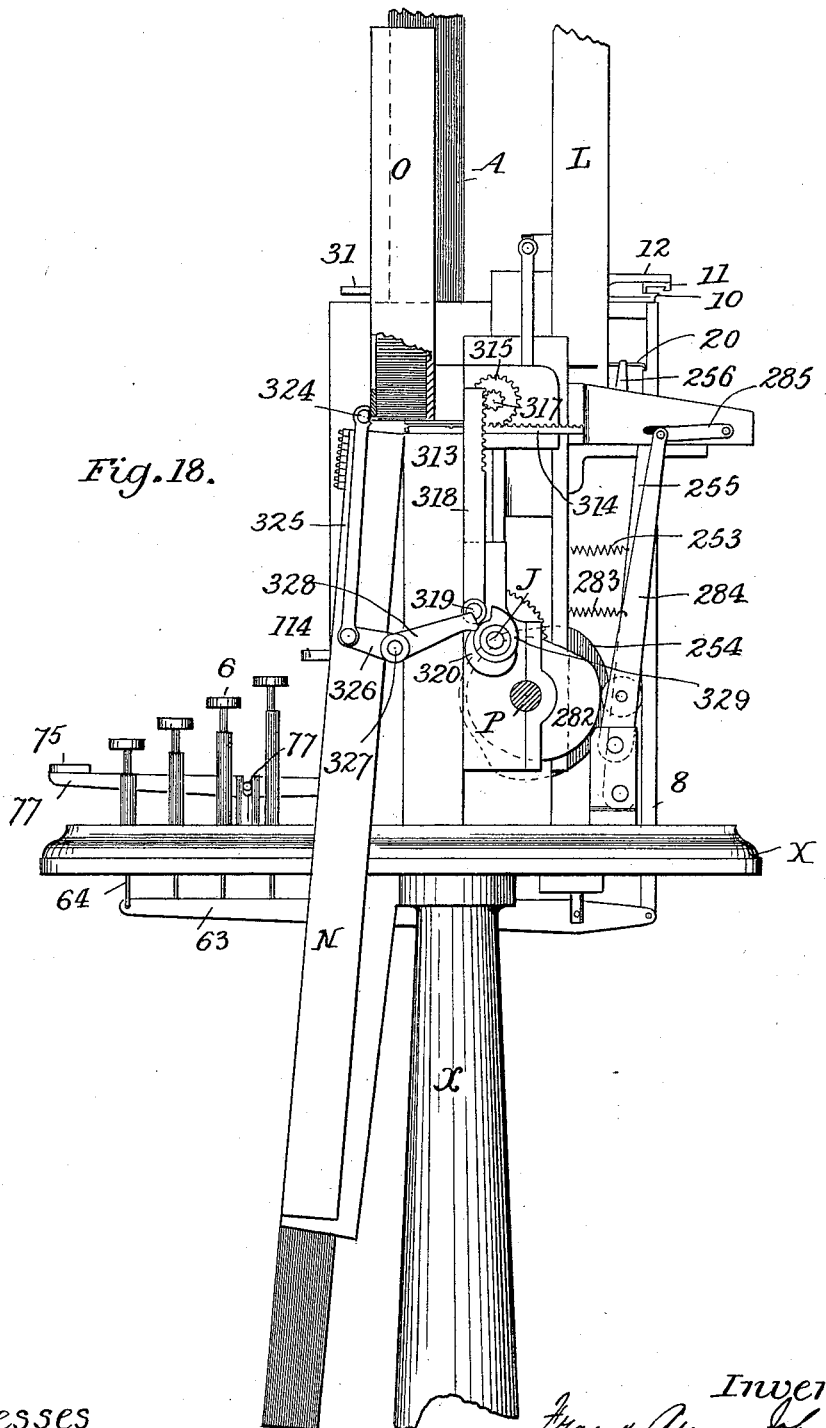

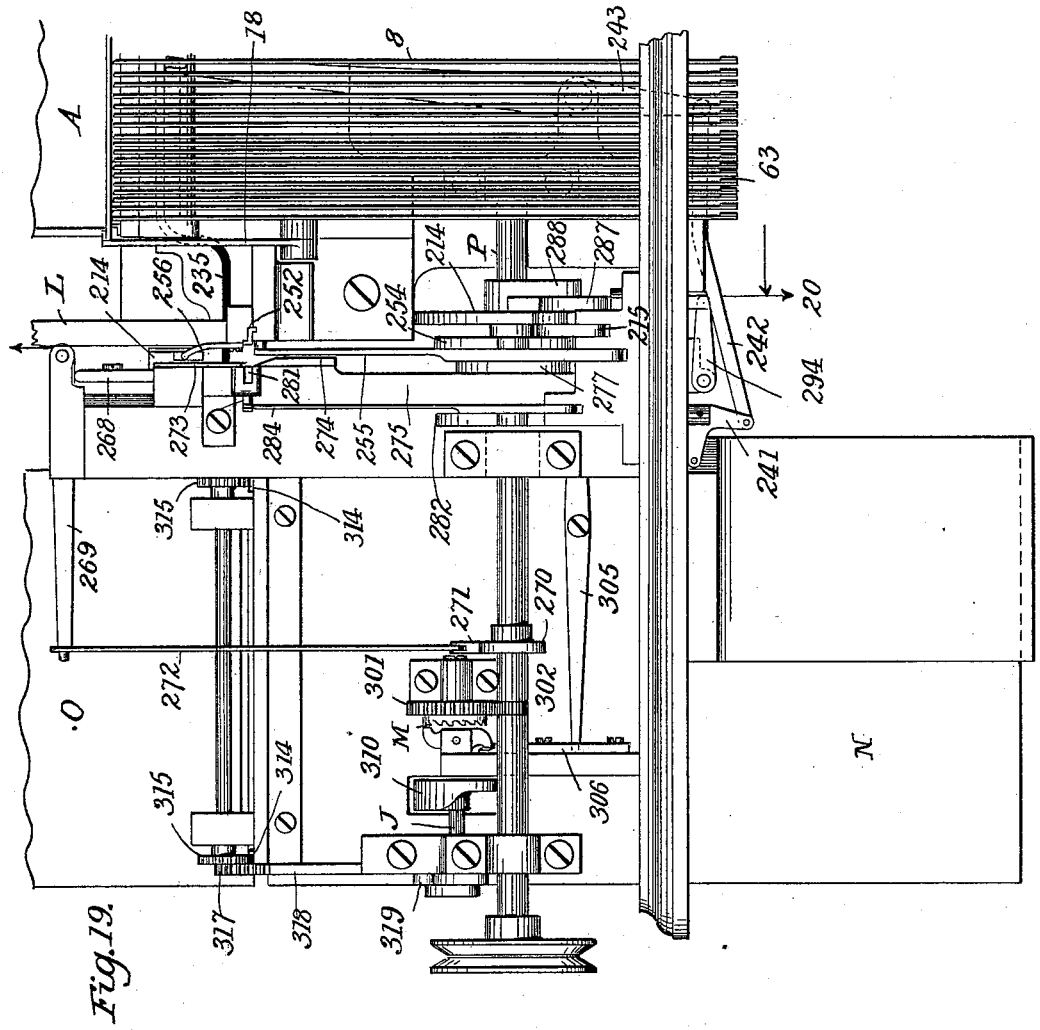

No. 607,045. Patented July 12, 1898.
F. A. JOHNSON.
TYPE SETTING AND JUSTIFYING MACHINE.
(Application filed Sept. 18, 1895.)
(No Model.) 18 Sheets—Sheet 13.

Witnesses
Jno G Hinkel
Robert Watson

Inventor
Frank Amos Johnson
by J H Watson, Atty

No. 607,045. Patented July 12, 1898.
F. A. JOHNSON.
TYPE SETTING AND JUSTIFYING MACHINE.
(Application filed Sept. 18, 1895.)
(No Model.) 18 Sheets—Sheet 14.
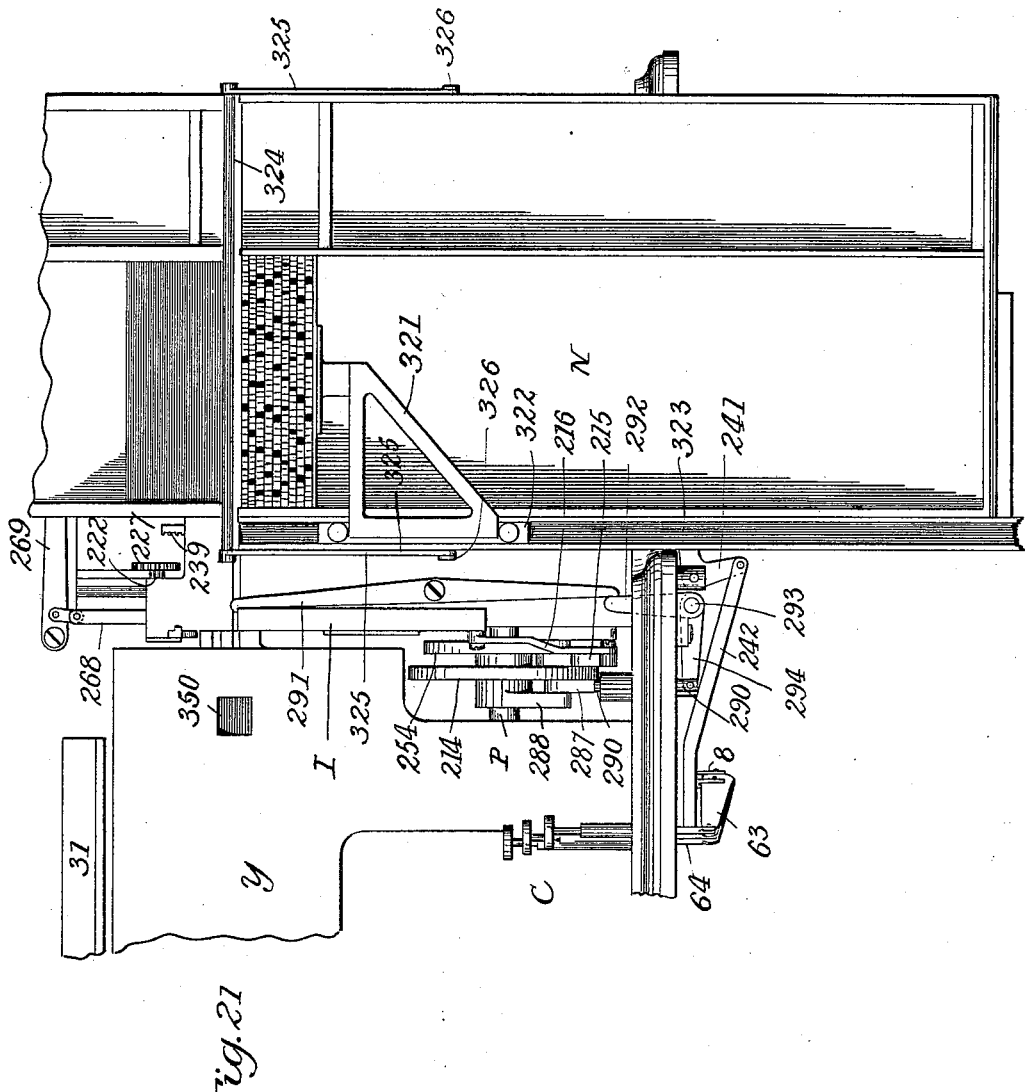

No. 607,045. Patented July 12, 1898.
F. A. JOHNSON.
TYPE SETTING AND JUSTIFYING MACHINE.
(Application filed Sept. 18, 1895.)
(No Model.) 18 Sheets—Sheet 15.
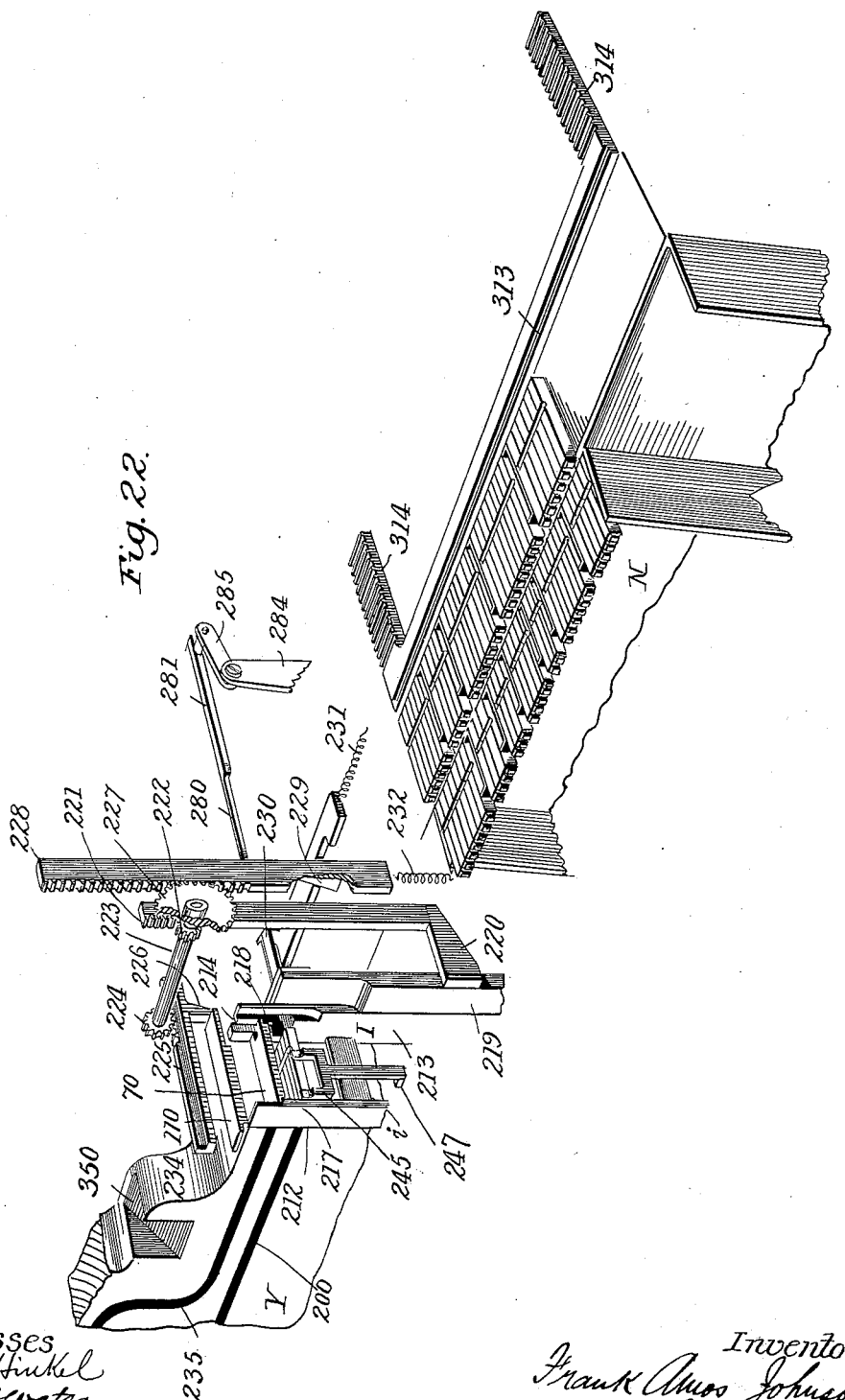

No. 607,045. Patented July 12, 1898.
F. A. JOHNSON.
TYPE SETTING AND JUSTIFYING MACHINE.
(Application filed Sept. 18, 1895.)
(No Model.) 18 Sheets—Sheet 16.
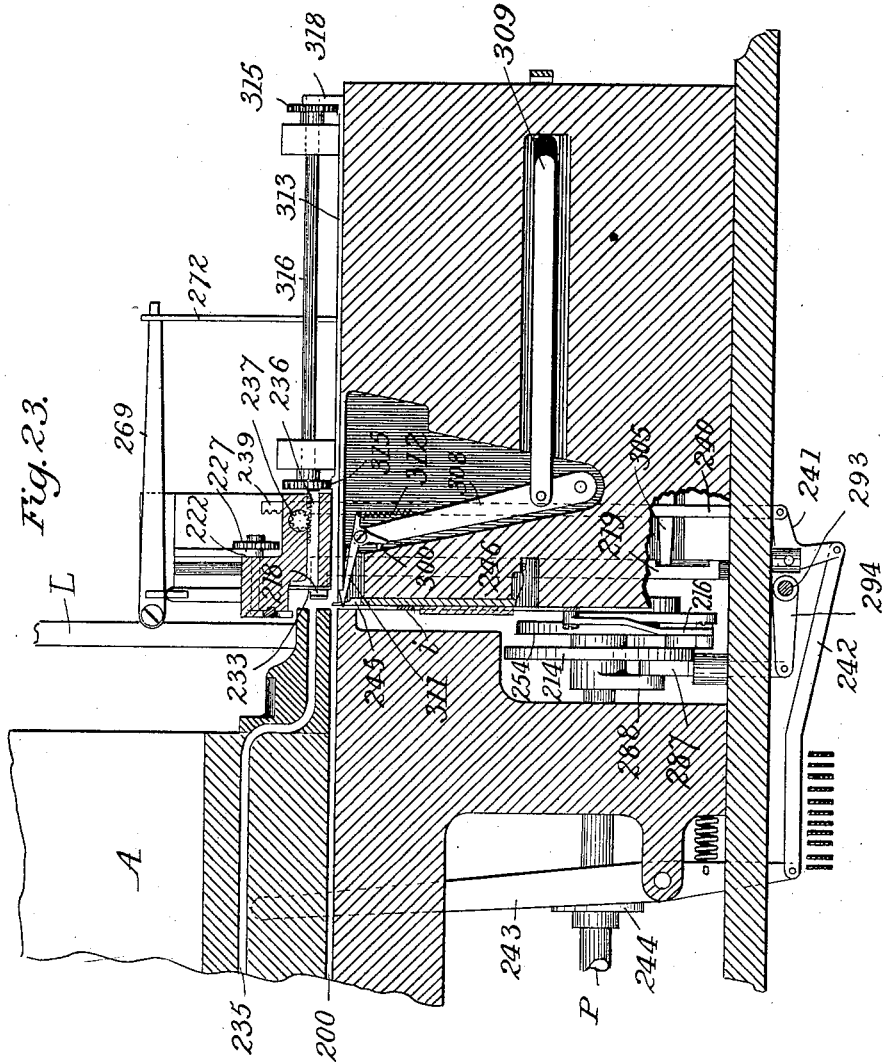

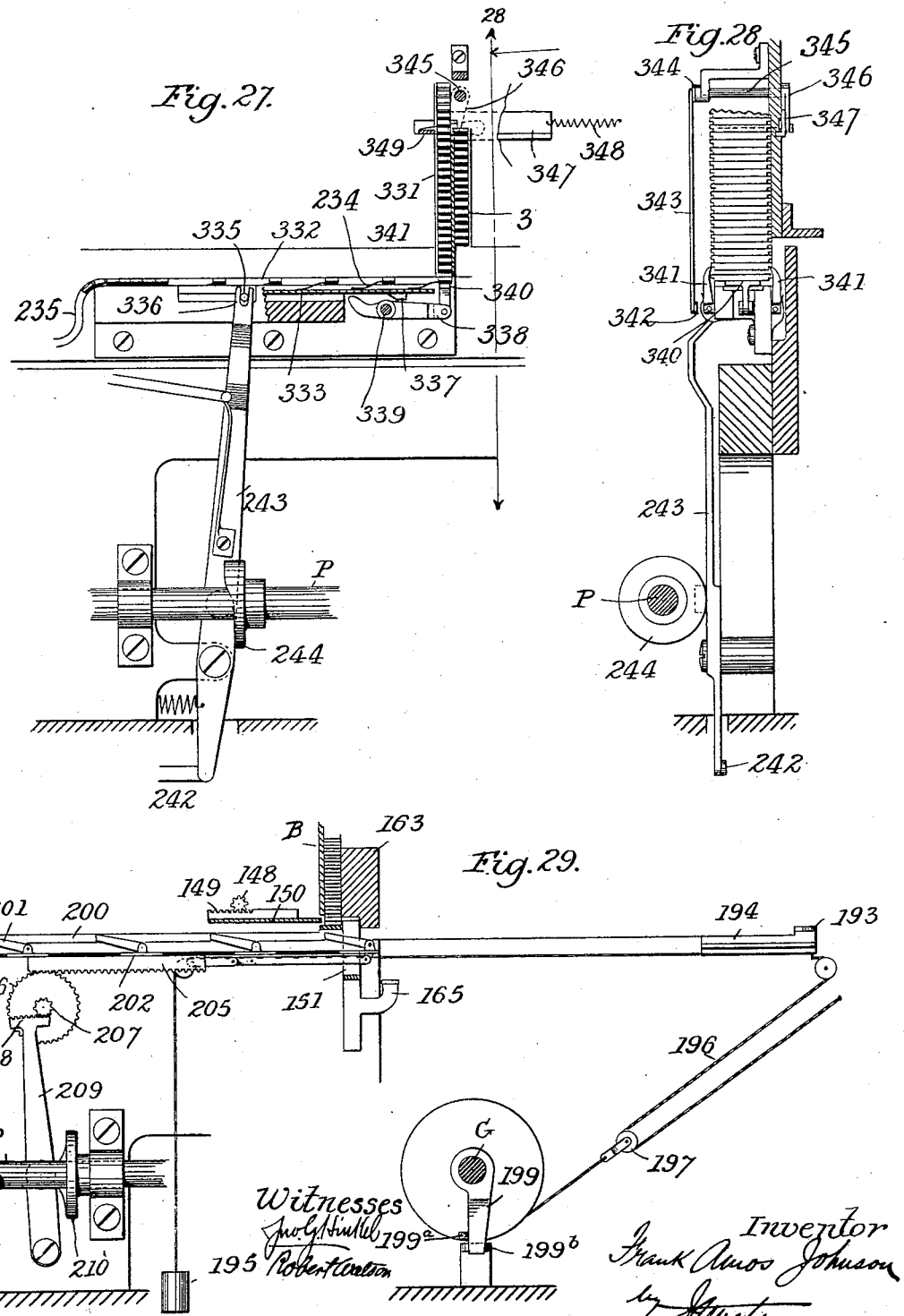

No. 607,045. Patented July 12, 1898.
F. A. JOHNSON.
TYPE SETTING AND JUSTIFYING MACHINE.
(Application filed Sept. 18, 1895.)
(No Model.) 18 Sheets—Sheet 18.
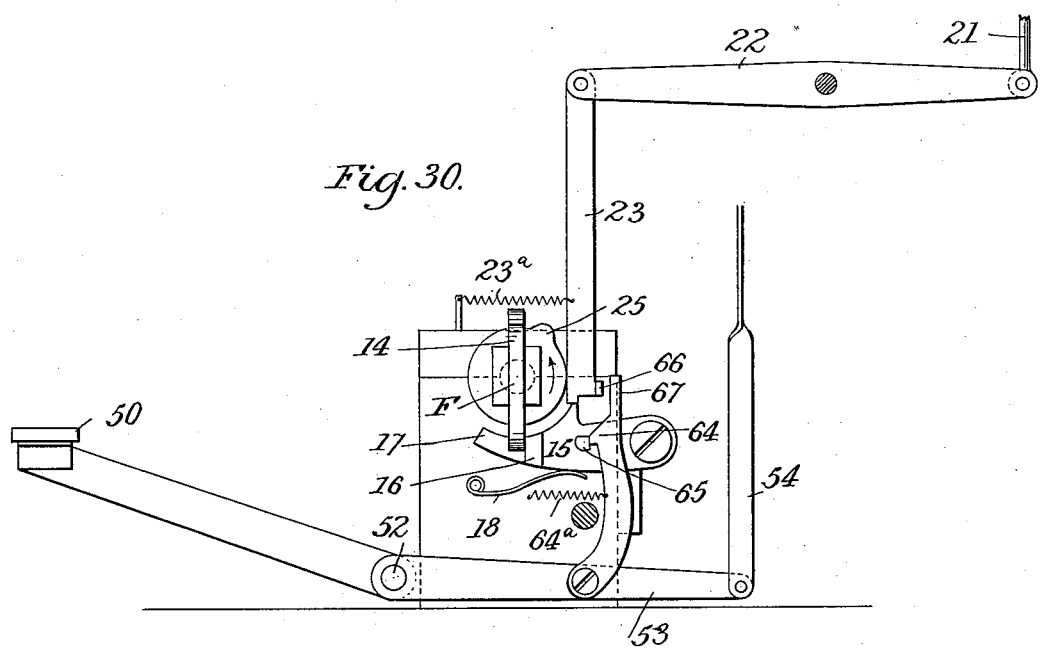
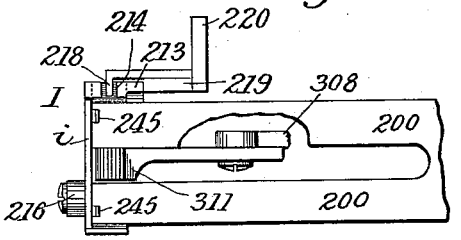
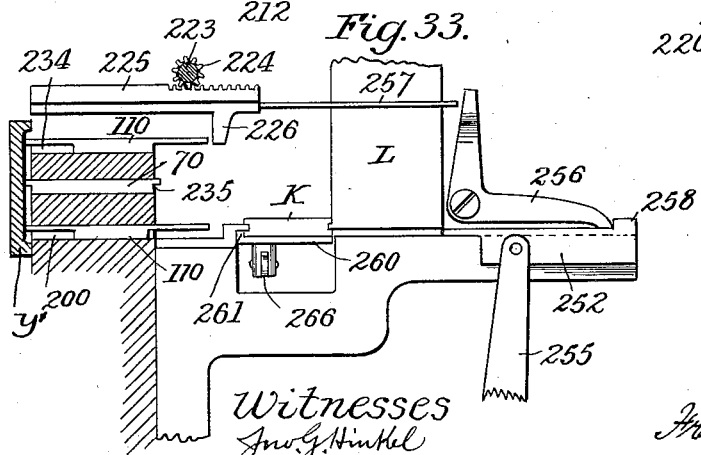
Witnesses
Jno. G. Hinkel
William E. Neff
Inventor
Frank Amos Johnson
by J. H. Watson

UNITED STATES PATENT OFFICE.

FRANK AMOS JOHNSON, OF PHILADELPHIA, PENNSYLVANIA, ASSIGNOR TO THE JOHNSON TYPESETTER COMPANY, OF PORTLAND, MAINE.

TYPE SETTING AND JUSTIFYING MACHINE.

SPECIFICATION forming part of Letters Patent No. 607,045, dated July 12, 1898.

Application filed September 18, 1895. Serial No. 562,891. (No model.)

*To all whom it may concern:*

Be it known that I, FRANK AMOS JOHNSON, a citizen of the United States, residing at Philadelphia, in the county of Philadelphia and State of Pennsylvania, have invented certain new and useful Improvements in Type Setting and Justifying Machines, of which the following is a specification.

The object of this invention is to produce a type-setting machine which will rapidly and accurately assemble and justify lines of type and deposit them in a galley.

In the machine in which the invention has been embodied and which is illustrated and described in the present application there is a magazine of type, a stick upon which the type for a line are assembled, and a reciprocating carrier arranged to transfer the type to the stick by a short and quick movement. In the stick the words are separated by temporary quads, which are assembled from a quad-magazine in the same manner as the type are assembled.

The spacing or justifying of each line is effected by cutting off spaces from prepared "space-timber" and inserting them in lieu of the temporary quads, the latter being returned to their magazine. The spaces for each line are uniform in width, and their size is controlled by a "line-justifying quad," which is inserted in each line immediately after the line is assembled in the stick. The line-quads are cut from blanks, and their length is determined in accordance with two factors—viz., the total amount of space between words and the number of word-spaces in the given line. The lengths of the line-quads are determined by a series of wedges carried upon a common support and equaling in number the greatest number of word-spaces likely to occur in a line. The wedge-support is movable in two directions. In one direction it is moved in accordance with the number of word-spaces in the line, and this movement brings the proper wedge into operative position. The wedge-support is then moved lengthwise of the wedges in proportion to the total amount of space in the line which is to be occupied by the word-spaces, and this movement brings to operative position a point on the selected wedge, which is a suitable gage for the length of line-quad for the given line. A piece of "line-quad timber" is then ejected from its magazine and placed opposite the gaging-point on the selected wedge and over a knife which then shaves off the end of the timber or blank, leaving it a proper length, and the line-quad thus prepared is added to its line. The length of the quad, as above stated, determines the word-spaces for the given line—that is, it controls the justification for that line. This first portion of the invention is complete in itself, and its product (the lines spaced with temporary quads and provided with justifying line-quads) may be transferred at any convenient time and in any convenient way to a machine for inserting the final spaces. It is preferable, however, to conduct the lines directly to the spacing mechanism, and in the machine under consideration these prepared lines are transferred through a runway to such mechanism. Each line-quad serves as a gage for cutting the spaces for the corresponding line. The space-timber is fed to a cutter which removes more or less, depending upon a gage which is set by the line-quad, and the spaces, cut to suitable widths, are afterward injected into the line, the temporary quads having been previously removed. The temporary space-quads are returned to their magazine, while the line-quads and the shavings of space-timber are collected for remelting, being both preferably formed of type-metal. The completed and justified lines are then transferred to a galley.

For a full, clear, and exact description of the invention reference is had to the following specification and to the accompanying drawings, in which—

Figure 1 is a front elevation of the left end of the machine, showing the keyboard and type-assembling mechanism, most of the key-levers and their connections being omitted for clearness. Fig. 2 is a rear elevation of that portion of the machine shown in Fig. 1, with parts of the frame broken away to show the interior mechanism. Fig. 3 is a front elevation showing the parts in the rear of the section-line 3 3 of Fig. 6, the key-levers and lifting-rods being omitted. Fig. 4 is a plan view of the left end of the machine. Fig. 4ª is a plan view of the type-hook detached. Fig. 5 is a sectional view taken on the line 5 5 of Fig. 6. Fig. 6 is an elevation of the left end of the machine. Fig. 7 is a vertical section on the line 7 7, Fig. 5, looking in the direction of the arrow. Figs. 8 and 9 are similar views taken on the lines 8 8 and 9 9, respectively, of Fig. 5. Fig. 10 is a perspective view of one of the fingers for transferring the type to the stick. Fig. 11 is a perspective view showing the stick and wedge-piece and the connections of the latter. Fig. 12 is an enlarged view of the differential ratchet-bars. Fig. 13 is an enlarged section on the line 13 of Fig. 4. Fig. 14 is an enlarged section through the stick, showing the type-retaining pawl and the extension guard-plate. Fig. 15 is a plan of the right end of the machine, showing the spacing mechanism, parts being broken away. Fig. 16 is a partial section on the line 16, Fig. 15. Fig. 17 is a side view of the cam and cam-lever shown on the right of Fig. 16. Fig. 18 is an elevation of the right end of the machine. Fig. 19 is a rear view of the right end of the machine. Fig. 20 is a section on the line 20 of Fig. 19, looking in the direction of the arrow. Fig. 21 is a front view of the left hand of the machine, showing the galley. Fig. 22 is a perspective view of portions of the mechanism for preparing the justifying-spaces and inserting them in a line and portions of the galley and devices for transferring the line to the galley, part of the runway being shown in dotted lines; and Fig. 23 is an enlarged vertical section taken on the line 23, Fig. 15. Fig. 24 is a perspective view of one of the temporary quads. Fig. 25 is a similar view of one of the justifying line-quads. Fig. 26 is a similar view of one of the blanks for final spaces. Fig. 26ª is a perspective view showing one of the final space-blanks cut in two. Fig. 27 is a sectional view looking from the rear, showing the devices for returning the temporary quads to their magazine. Fig. 28 is a section on the line 28 of Fig. 7. Fig. 29 is a view showing means for transferring the line from the assembling to the space-inserting mechanism, the parts being shown detached from the frame. Fig. 30 is an enlarged view of part of the mechanism shown on Fig. 9. Fig. 31 is a plan view of the elevator and some of the adjacent parts. Fig. 32 is a side view of the elevator, and Fig. 33 is a section on the line 33 of Fig. 15.

The various working parts of the machine are mounted upon a main frame which consists, chiefly, of a table X, supported upon standards $x$, and a vertical plate-like casting Y, arranged longitudinally upon the table. The casting Y is provided with suitable openings, as shown, to accommodate the various mechanisms. At its upper end there is a rearwardly-projecting shelf $y$, and in front there are two plates which form the runways for the type and support the devices for moving the type in the runway. Various other brackets and supports for the operating parts of the machine are attached to form part of the main frame. They form no part of the invention, however, and their construction, which may be varied as desired, will be obvious from the drawings.

*The magazine.*—The magazine A is provided with type tubes or channels corresponding in number to the number of different characters which the machine is designed to assemble. These are arranged in two main groups, Fig. 4, the lower-case tubes being arranged in a group 1 and the tubes for upper-case letters in a group 2, the groups being preferably arranged in line with each other and the lower-case group being nearest to the "stick" S, upon which the lines are assembled. There are also one or more channels 3 in the magazine for quads which are inserted temporarily in the line. These temporary-quad channels are preferably arranged between the two sections of the magazine. In addition to the type and quad magazines there is a magazine B for the line-justifying quads or pieces previously mentioned. The channels of the magazines may be of any approved construction.

*Type-selecting mechanism.*—The type are selected from the magazine by means of a bank of keys C, which operate through intermediate mechanism upon a series of pushers 4, which are held under a slotted guide or cap-piece 5 in the rear of the magazine and opposite the lower ends of the type-tubes, Figs. 4, 8, and 10. For selecting the lower-case type the keys 6 are connected with levers 7 and the depression of any key rocks its corresponding lever and raises a lifting-rod 8 at the rear of the machine, which in turn raises the rear end of the type-pusher 4 corresponding to the key. The key-levers 7 are arranged diagonally between the keys and the lifting-rods 8 of the lower-case magazine. The type-ejecting pushers 4 are formed of spring metal and may be reduced in thickness, as at 9, to permit the rear end to rise up readily without displacing the body of the pusher. The rear end of each pusher is provided with an upturned foot 10, which engages a groove 11 in a laterally-reciprocating bar 12, resting on ways 12ª, said bar being reciprocated once for each key depressed, in a manner to be presently described.

There is a constantly-running power-shaft P, and in front of it and connected by gearing is a constantly-running counter-shaft E. An escape-shaft E′, in line with shaft E, is normally stationary and is arranged to make one complete revolution each time a key of the keyboard is operated, connection being had with the counter-shaft E by means of a clutch F, Fig. 3. Any suitable clutch may be used for this purpose. As shown, there is a crown ratchet-wheel 13 upon the end of the counter-shaft and a radial pawl 14 upon the adjacent end of the escape-shaft. The pawl is normally held out of engagement with the wheel 13 by a lever 15, having a stop or projection 16 and a cam-surface 17, Figs. 3, 9, and 30. The lever 15 is normally elevated by means of a spring 18, and when depressed it releases the tail end of the pawl 14, and a spring 19 throws the opposite end of the pawl into engagement with the ratchet-wheel 13. As the escape-shaft is carried around, the stop-lever, which has returned to its normal position, engages the pawl 14 at the end of a single revolution. At the depression of each key of the keyboard its corresponding rod 8 in the rear of the machine raises a universal bar 20, supported in bearings 20ª upon the main frame, (see Fig. 9,) and a rod 21, connected to the bar, rocks a lever 22 and depresses a rod 23, which normally hangs over a projection 24 upon the stop-lever 15. The rod 23 depresses the lever 15, which permits the clutch F to engage, and the escape-shaft is thus given one revolution. During the revolution of the shaft a cam projection 25 strikes the rod 23 and throws it off of the lever projection 24, permitting the stop-lever 15 to rise. It will thus be seen that each time a key is operated the escape-shaft can receive but one revolution. As has been explained, the revolution of the escape-shaft follows immediately upon the elevation of the rod 8 and the engagement of the foot 10 of the pusher in the groove 11 of the bar 12. The rotation of the escape-shaft by means of a crank 26ª, Fig. 3, operates a pitman 26 and rocks the shaft 27. The bar 12 is connected to and operated by arms 28 upon this rockshaft and the particular type-pusher 4, which is in engagement with the bar, is carried forward to eject the type and then carried backward to its normal position.

*Type-assembling mechanism.*—The type are pushed out of the magazine onto ways 30 beneath an overlying plate 31, Figs. 1, 3, and 8. Between and below the ways 30 there is a conveyer-band 32, carried by pulleys 33 upon a carriage 40, which is reciprocated back and forth by mechanism to be presently described. The travel of the carriage 40 at each reciprocation is about equal to half the width of the magazine. The lower part of the band is attached to a fixed stud 32ª and at the point of attachment the band is of course stationary. The portion of the band above the pulleys travels twice as fast as the carriage. The band is located between the ways 30, and to it are connected two conveyer-fingers 34. These conveyer-fingers, as shown in detail in Fig. 10, consist of T-shaped pieces having shanks 35, which extend down and between the ways and are pivoted to slides 36, arranged to travel in grooves 37, just above the upper part of the band or belt 32. The conveyer-fingers are in the form of elbow-levers, having arms 38, which extend down through perforations in the band 32 and are retained therein by locking-nuts 39. As the band moves to the left, the fingers 34 are thrown up, so as to engage and convey any type which may be upon the ways. When the motion of the band is reversed, the conveyer-fingers are carried down between the ways and then to the right, passing under any type which may be upon the ways during this movement. The pulleys 33 are mounted in bearings upon the ends of the carriage 40, which reciprocates bodily in the grooves 41 in the plates which form the ways. As shown, there are heads 42 on the ends of the carriage 40, which heads are provided with yokes in which the pulleys 33 are journaled and with side bearings which travel in the grooves 41. The carriage 40 is reciprocated by means of a link 43, elbow-lever 44, and pitman 45, the latter connecting with the escape-shaft E. The axis of the elbow-lever 44 is at right angles to the shaft E, and for that reason the pitman 45 is connected with the elbow-lever and the crank 46 upon the end of the escape-shaft by means of ball-and-socket joints.

At each reciprocation of the carriage 40 the left-hand finger 34 conveys any lower-case type which may have been projected onto the ways to the left and leaves it behind an intermediate bifurcated hook 100, which at the next stroke transfers it to a spring-pawl 47. If an upper-case letter is projected from the right-hand section of the magazine, the right-hand finger 34 conveys it to the middle of the magazine, from which point it is taken on the succeeding reciprocation by the left-hand finger 34 and conveyed to the intermediate hook 100. The type are assembled against a "follower" 102 and between the retaining-pawl 47 and an abutment 48, the latter being mounted upon a slide 48ª and adjustable to adapt the machine for different measures or column widths. The portion of the ways included between the pawl 47 and the abutment 48, upon which the line is assembled, is designated as the "stick" S. As shown in Figs. 1 and 3, the abutment 48 is adjusted for a narrow column, while in Fig. 4 it is adjusted for a wide column. It is necessary to convey upper-case type from the upper-case magazine to the stick before a succeeding lower-case type is ejected onto the ways, and for this purpose I arrange to give the carriage 40 an extra reciprocation as the upper-case key is released, as will be presently explained.

*Assembling upper-case type.*—The keyboard C has a single alphabet of keys, which normally select lower-case letters and which may be made to select upper-case letters upon the depression of an upper-case or "cap" key 50. This key is carried by a lever 51 upon a rock-shaft 52. Upon this shaft is an arm 53, which is connected by a link 54 with the arm of a rock-shaft 55. An arm 56 on rock-shaft 55 is connected with a bar 60, and this bar is connected by means of elbow-levers 61 with a pair of laterally-movable plates 62, which are notched on their rear edges to receive and guide the upper ends of the lifting-rods 8. One of the plates 62 is opposite the lifting-rods 8 of the upper-case magazine, and the other plate is opposite the lifting-rods of the lower-case magazine. The elbow-levers are arranged to throw the plates out alternately. Normally the lower-case lifting-rods are in position to engage the type-pushers 4, and the upper-case lifting-rods are held out to the rear and when raised do not engage the pushers. The lifting-rods are normally held in engagement with plates 62 by springs 8ª. When the cap-key is depressed, the positions of the lifting-rods are reversed, the upper-case rods being brought into operative position and the lower-case rods rendered inoperative. The connections from the keys to the lower-case lifting-rods 8 are by means of the ordinary key-levers 7, and the connections to the upper-case lifting-rods are made through similar key-levers 63, which are connected with the keys or key-levers 7 by means of links 64. The upper key-levers 63 run to the left and rear diagonally to connect with the lower-case lifting-rods, and the lower key-levers run to the right and rear diagonally to connect with the upper-case rods.

As heretofore explained, each upper-case type requires two reciprocations of the conveyer-fingers to carry it to the stick. When several upper-case type are selected in succession, the first reciprocation of the conveyer for each type answers to the second reciprocation for the preceding type, and an extra reciprocation of the conveyer is only needed for the last upper-case type of a series. This is accomplished by tripping the clutch F twice and giving the escape-shaft two revolutions. The clutch is first tripped, as heretofore explained, through the connections 20 to 24, inclusive, the latch 15 being depressed by the rod 23. When the cap-key is depressed, a hook or pawl 64, connected with the arm 53, passes over a pin 65 on the latch 15, and when the cap-key is released the hook 64 is drawn down by the spring, which raises the cap-key and carries with it the lever 15, permitting the clutch to engage and giving the escape-shaft a second revolution. At the completion of the revolution of the escape-shaft the cam 25 swings the rod 23 to the right to release the projection 24 of the lever 15, and at the same time a projection 66 upon the bar 23 strikes the tail 67 of the hook 64 and disengages the hook from the latch 15, thus permitting the latch 15 to rise and disengage the clutch F. In this manner the escape-shaft is given an extra revolution each time the cap-key is released, and the double reciprocation imparted to the fingers 34 conveys the last upper-case type to the stick before the next lower-case type is selected.

*Temporary word-space quads.*—The temporary word-space quads 70 are preferably made of steel and in the form shown in Fig. 24. The bodies are made type-high, and at each end there are extensions or lips 71 and 72, the lip 72 having a central notch 73, for a purpose which will be explained later. In the upper surface of the quad there is a groove or nick 74, corresponding with the nick in the type. These temporary quads are stored in a tube 3 of the magazine, which is located between the upper and lower case tubes. When a quad is projected onto the ways 30, it is immediately transferred by the left-hand conveyer-finger 34 to the stick. The width of the temporary quads is preferably greater than the maximum width of the final word-spaces, and for the purposes of this application the width will be assumed as one-quarter inch. These temporary quads are ejected from their magazine by a pusher and a space-key and connections, which will now be described.

*The space-key and its connections.*—The space key or bar 75 is located in front of the keyboard and mounted on levers 76, attached to a rock-shaft 77, Figs. 1, 3, 4, and 8. Through an arm 78 on the rock-shaft, link 79, and elbow-lever 80, Fig. 8, a lifting-rod 8, connected to the lever, is raised to render a space-pusher operative in the same manner in which the type-pusher is rendered operative. The space-lifting rod 8 is always operative, not being thrown out when the cap-key is depressed. Each time a space is selected the clutch F is tripped and the escape-shaft makes a revolution in the manner heretofore described in the selection of type and the bell-crank lever 44 is rocked, thereby operating the conveyer which transfers the space to the stick. Connected to the lever 44 by a link 81 is a lever 82, upon the upper end of which is mounted a pawl 83, playing in the teeth of a ratchet-bar 84, Figs. 3, 11, and 12. The pitch of the teeth of this ratchet-bar is equal to the width of a temporary space, or one-quarter inch. The throw of the pawl 83 is slightly less than the pitch of the ratchet 84, and hence the pawl normally plays idly on a tooth of the ratchet without moving the bar. The pawl is held against the ratchet by means of a spring 87. A holding-pawl 86, with spring 85, prevents backward movement of the ratchet 84. Each time the space-key is operated a spring-pawl 88, carried by a lever 89, engages the ratchet-bar 84 and draws it forward sufficiently to permit the pawl 83 to engage another tooth, and the succeeding movement of the pawl 83 therefore moves the ratchet-bar 84 to the extent of a tooth. The pawl-lever 89 is connected with the space-key rock-shaft by means of an arm 90, link 91, elbow-lever 92, and link 93. The ratchet-bar 84 has a toe 84ª, which engages the slide 48ª, upon which the abutment-block 48 is carried, and the length or measure of the stick is therefore increased one-fourth of an inch for each space inserted in the line. Thus if there are four word-spaces in the line the temporary quads will aggregate one inch and the stick will be lengthened or opened up one inch and will therefore receive the temporary spaces without shortening up the space allotted to the type. After a line is assembled the difference between the amount of type in the line and the length of the stick or measure of the column will therefore be equal to the total amount of the ultimate word-spaces which will be required to fill the line to the proper measure. In other words, it may be said that the introduction of the temporary spaces do not change the amount of matter in the stick, for each time a space is introduced the stick is lengthened the width of the space. By the use of the devices above described the stick may be opened up a normal space or any other desired amount each time the space-key is operated simply by varying the ratchet-teeth on the throw of the pawls.

*The space-register.*—The type are delivered by the conveyer-fingers 34 to a hook 100, which travels back and forth past the holding-pawl 47 and carries the type into the stick against a follower or head 102 at each reciprocation, moving the previously-assembled portion of the line sufficiently to receive the last type which has been selected, Figs. 1, 4, and 11. During its movement to the right the hook passes under the type which rests against the retaining-pawl 47 and at its subsequent movement to the left it draws the type with it. The hook 100 is pivoted to a lever 101, which is connected with the elbow-lever 44 by means of link 81.

The type are sustained in proper position on the stick by the follower 102, which is connected to a scale 103, traveling in a groove 104 in the face of the frame. The scale and follower have a normal tendency to the right, due to a weight $103^a$ and a connecting-cord. The pointer 105 indicates the amount of matter assembled in a line. If the pointer were stationary, its reading on the scale would at all times show the full amount of matter assembled in a line, including the full width of the temporary spaces. It is desirable that the pointer should only show the width of the character-type plus normal spaces, so that the operator may readily determine when sufficient matter has been introduced to form a proper line in the stick. To accomplish this, the pointer is moved to the left the amount of a temporary space less a normal space, while at the same time the scale is moved to the left the full amount of the temporary space. The difference in the movements of the pointer and scale will therefore be a normal space. For instance, if the temporary space be one-quarter of an inch the scale will be moved one-quarter of an inch to the left when one is introduced to the line, and if the normal space is one thirty-second of an inch the pointer would be carried to the left seven thirty-seconds of an inch, making the relative movement of the pointer and scale one thirty-second of an inch or the normal unit-space. The movement of the pointer or index each time the space-key is operated is effected as follows: The pointer is connected by means of a bar 106 with a rack 107, lying adjacent to and parallel with the rack 84 and connected with said rack by a spring 108, Figs. 3, 11, and 12. The pitch of the rack 107 is equal to the difference between the temporary space and the normal space or in the present instance seven thirty-seconds of an inch. The pawl 83, which moves the rack 84 each time a space is inserted, also operates upon the rack 107 in the same manner, the pawl 87 being broad enough to engage both of the racks, and the pawl 86 having two steps, one engaging each rack. By the mechanism heretofore described the type and temporary spaces for a line are assembled upon the stick, and the amount of matter in the line, plus normal spaces, is registered on the scale.

*The line-justifying quads.*—A line-justifying quad is inserted in each line after the line is assembled. These quads are prepared from blanks 110, one of which is represented in Fig. 25. It consists of a body-piece 111, which is less in length than type-high and from which extend elongated lips 112 and 113. Before inserting the quad in the line it is cut to a length which bears a certain relation to the widths of the final or justifying word-spaces—that is, the word-spaces which are ultimately inserted and which justify the line. The line-justifying quad-blanks are carried in the magazine B, previously referred to, and after each line is assembled a blank is discharged from the magazine, trimmed to the proper length, and inserted in the line automatically.

The justifying line-quads might be prepared in various ways other than by cutting them to the proper length. For instance, they might be cast or compressed to the desired length, and in its broader aspect the present invention is not dependent upon the particular method of forming these quads. The preferred method, however, is that of cutting the line-justifying quads from blanks or "timber," and the mechanism for thus forming them will now be described.

*Preparing and inserting line-justifying quads.*—At the rear of the keyboard is the starting-key 114, connected with an arm 115 on a starting-shaft 116, Figs. 1 to 7, inclusive. This shaft is connected by a link 117 with an arm 118 upon a transverse shaft 119. When the starting-key is depressed, a pawl 120 upon shaft 119 is withdrawn from a notch in a vertical rack 121, and the rack is raised by a weight 122, connected to it through a lever 123 and link 124. This rack, through gears 125 126, Figs. 1 and 2, carries to the left a rack 127, and a pawl 128, mounted on this rack, carries the assembled line of type to the left until it passes a pawl 129, carried by a rack 130.

The lever 123 strikes a pin 131, Fig. 2, on an arm 132, carried by a pawl 133, withdrawing the pawl from a circumferential groove in a vertical shaft 134 and permitting the shaft to fall. The pawl 133 is weighted by the arm 132 and normally tends to engage the groove in shaft 134. This shaft carries with it a rack 135, which turns a gear 136 upon the shaft 137, Figs. 2, 5, and 11, and a pinion 138 on this shaft engages the rack 130, Figs. 3 and 11, and forces it to the left, the pawl 129 at the same time engaging the line of type, compacting it against the follower upon the scale and the abutment 48. The shaft 137 has a collar 137$^a$, which is connected with a pinion 137$^b$ by a single tooth on each part, thus permitting the pinion to revolve independently through nearly three hundred and sixty degrees. It will be evident that the amount of movement of the pawl 129, and consequently the downward movement of the shaft 134, will depend upon the amount of space left unfilled in the line—that is, it will be in proportion to the total of word-spaces necessary to justify the line. When the shaft 119 is rocked by the starting-key, an arm of the lever 118, through a link 94, Fig. 3, and elbow-lever 95, draws down a hook 96, which engages a pin on the pawl 83 and withdraws the pawl 83 from the ratchets 84 and 107. The end of the pawl 83 simultaneously engages and withdraws the pawl 86 from the ratchets, whereby they are released and permitted to return to their initial position under the influence of a weighted cord 97. The upper end of the hook 96 engages the tail of a locking-pawl 98, which, under tension of a spring 98$^a$, tends to engage notches 99 in the slide 48$^a$, which carries the abutment 48. When the hook 96 is lowered, the locking-pawl simultaneously springs up and locks the abutment against movement while the line is being compacted against it. Just before the ratchets 84 and 107 reach their initial positions a pin 84$^b$, Fig. 13, engages the hook 96 and disengages said hook from the pin 83$^a$ in the rear of the pawl 83, thus permitting the pawls to rise and engage the ratchets. After the line-key is pressed down it is held in that position until the rack 121 is lowered by the revolution of the cam-shaft G, for the reason that the starting-key cannot rise until the pawl 120 is again permitted to enter the notch in the rack 121. The abutment 48 is therefore locked during a considerable period.

Upon the shaft 134 are a series of wedges 139, arranged radially and equal in number to the maximum number of word-spaces which is likely to occur in any given line. The wedges and their supporting-shaft will be denominated a "wedge-piece." These wedges are tapered differently and for any given line a wedge is selected, as will be hereinafter explained, to control the cutting of the justifying line-quad and indirectly to effect the justification of the line. The selection of the wedge for a given line is effected by connecting the wedge-shaft with slide 48$^a$ and the word-space ratchet-bar 84. The connections shown consist of a gear-rack 140 upon the front face of the slide 48$^a$, a pinion 141, vertical shaft 142, pinion 143 at the lower end of this shaft, diagonally-arranged rack 144, and pinion 145, splined upon the lower part of the wedge-shaft. It will thus be seen that the proper wedge corresponding to the number of word-spaces in a line is selected while the line is being assembled. The upward movement of the rack 121 also revolves a gear 147, and pinions 148, connected with said gear, operate racks 149 upon a plunger 150, which enters the lower portion of the line-quad magazine B and ejects a blank for the line-quad onto an elevator 151 in front of a plunger 146 and opposite a chisel 161. The chisel cuts against a shearing-block 163$^a$, which block, as shown in Figs. 7 and 29, also forms one side of the magazine B. The elevator 151 is normally supported in its highest position by means of a spring 164, as shown in Fig. 7. The elevator is provided with an arm 165, by which it is operated. A second rack on slide 121 engages a pinion 137$^b$ on the shaft 137.

The first effect of the operation of the starting-key is to release the rack 121, which operates the slide 127 and pawl 128. This pawl carries all of the type which are assembled in the stick to the left of the compacting-pawl 129, thereby leaving upon the right-hand portion of the stick a considerable space in which to assemble the first few type of the succeeding line. There is therefore no delay between the lines any more than what is necessary to strike the line-key. The rack 121 also operates the ejector 150, Fig. 2, and forces a line-quad blank onto the line-quad elevator 151 and opposite the plunger 146, Fig. 7. The wedge-shaft is then released and it descends, its rack 135 rotating the shaft 137 until the pawl 129 compacts the line against the abutment 48. The stoppage of the pawl 129 limits the downward movement of the wedge-shaft. During the downward movement of the wedge-shaft the plunger or gage 146 is forced out by the selected wedge, and the line-quad blank upon elevator 151 is set, so that the chisel 161 will cut off the proper amount from the projecting end, Fig. 7. The cam-shaft now raises the weight 122 and lowers the slide 121, thereby returning the plunger 150 and the pawl 128 to their initial positions. The downward movement of rack 121 also rotates the loose pinion 137$^b$, and by its engagement with the collar 137$^a$ the shaft 137 is rotated, thereby moving the compacting-pawl 129 to the right and raising the wedge-shaft to its upper position. This restores the parts to their normal positions, and they remain undisturbed until the line-key is again operated. The wedge piece or shaft is sustained by the pawl 133, and the rack 121 is therefore free to rise before the wedge-piece drops on account of the loose connection between them effected by the clutch 137$^a$ 137$^b$.

Upon a transverse-movement shaft G, Figs. 2, 5, and 6, is a sleeve 153, carrying a bevel-wheel 154 and a crown ratchet-wheel 155. This sleeve is continuously rotated by means of a pinion on the end of the driving-shaft P, which meshes with the bevel-gear on the sleeve. Upon the shaft G is a pawl 156, and the crown-wheel and pawl constitute a clutch H, which is similar to the clutch F, previously described, and a detailed description of which may therefore be omitted. Each time the starting-key is operated the clutch is tripped by a lever 157, connected with the arm 132, and the movement-shaft G is given one revolution and then thrown out of connection with the power-shaft. A revolution of the movement-shaft G performs the following operations:

First. A cam 158 operates a lever 159 and raises a chisel 161, which cuts a portion from one end of the line-quad blank, which has just been properly placed by the wedge-piece, the portion removed being discharged from an opening 162 in the face of the main frame.

Second. The wedge-shaft is raised and the line of type released from the pressure of the pawl 129. This is accomplished by means of the cam 163, which operates on lever 123, thereby raising the weight 122.

Third. The line of type and temporary spaces are drawn from the stick rearward onto an elevator R by means of a hook 167, Figs. 3, 6, and 11, which engages the nicks in the type. The hook is an elongated angular plate carried by a frame 168, which is pivotally connected to arms 169 upon a rock-shaft 170. The rock-shaft is operated at the proper moment by means of a segment-gear 171, rack 172, and cam-lever 173, having a roll 174, which bears upon the cam 175 upon the movement-shaft G. The type-hook is normally in position to engage the nicks of the type as they are assembled on the stick.

Fourth. The elevator R, Figs. 2, 3, and 11, is then lowered until the type is in line with a runway 200, through which the lines are afterward transferred to the machinery for inserting the final or justifying spaces. The hook 167 transfers the type to the platform 180 of the elevator, which is supported upon two sliding rods 181, provided with racks 182, which mesh with pinions 183 upon a shaft 184. The elevator is kept normally in its elevated position by means of a weight 185, attached to a cord 186, wound upon a drum on shaft 184, Figs. 2 and 6. A clip 188 holds the type in position upon the platform 180 of the elevator. As the movement-shaft continues to revolve a cam 189 depresses a lever 190 and rack 191, which rack engages a pinion 192 upon shaft 184, and through pinions 183 and their engaging racks the elevator is lowered until the platform 180 is in line with the runway 200, as previously explained. The bottom of the top plate 180 in descending engages the projection 165 upon the line-quad elevator 151, and the two elevators are carried down together to their lowest positions, the upper surfaces of both being in line with runway 200.

Fifth. The further rotation of the movement-shaft G causes the assembled line of type, with its appropriate line-quad, to be forced into the runway 200, through which it is conveyed by mechanism to be presently described. The line is forced into the runway by means of a finger 193, Figs. 6, 11, and 29, upon a slide 194. The slide is drawn to the right to move the line into the runway by a cord and weight 195. While a line is being placed on the elevator and lowered, the finger 193 is moved to the left by suitable means and held until the line is lowered. As shown, a cord 196 has one end attached to slide 194 and the other end attached to the frame. A second cord is attached to a sheave 197 in the loop of cord 196 and connected to a pulley 198, which is loose on shaft G, Fig. 29. As the shaft revolves the pulley 198 is carried around through the engagement of a fixed spring-arm 199 of the shaft with a shoulder $199^a$ of the pulley. This arm carries the pulley around until at the end of one rotation a cam $199^b$ throws arm 199 out of engagement with shouldes $199^a$, and the pulley is released. The weight 195 then pulls the finger 193 to the right, sweeping a line of type into the runway 200.

The lines having been assembled with temporary spaces of uniform size and each provided with a line-justifying quad cut to a proper length to control the selection of justifying-spaces, as heretofore described, are ready to be transferred to the word-space-inserting machine. This mechanism may be embodied in a distinct machine, to which the lines may be carried or fed in any desired way. In the present instance the lines are transferred automatically from the assembling-machine through a runway to the quad-inserting machine, all of the mechanisms being organized on a single base and adapted to be operated from the same power-shaft.

*The line-transfer mechanism.*—After the line leaves the elevators it enters a runway 200, through which it is carried to the spacing mechanism. The line is transported through the runway by means of a series of pawls 201, pivoted in lugs upon plates 202, which slide in grooves 203. These push-pawls 201 are in the form of elbow-levers, having depending arms which are connected with a reciprocating rod 204. This rod is constantly reciprocated by means of an attached rack 205, gear 206, pinion 207, and sector 208 upon an arm 209, which bears upon a cam 210 on the power-shaft P, the arm being constantly pressed against the cam by a spring 211. The rearward movement of the rod 204 draws the pawls down below the runway, in which position they pass under the type, and when the movement of the rod 204 is reversed the pawls tend to rise, and the pawl in the rear of the line engages and moves it forward toward the spacing mechanism, which is at the left end of the machine. It will be noted that the bar 204 and the pawls will operate constantly, while the type in the runway is permitted to move freely. When a line of type reaches the end of the runway, it is fed to the spacing mechanism only so fast as the latter is capable of taking care of it. This is due to the fact that the forward movement of the pawls is caused by spring-pressure and is not a positive movement. Hence the pawls may stop at any point in their forward movement.

*The spacing-machine.*—The space cutting and inserting mechanism is located, as shown, at the right end of the machine. It consists principally of a gage which is set by the line-quad, a magazine of space-timber, or space-pieces of maximum size, which are to be cut down to the proper size for spacing the different lines, means for ejecting a piece of space-timber from the magazine, means for cutting the required space from the timber, the size being regulated by the gage, and means for removing the temporary spaces from a line and inserting the prepared spaces.

The runway 200 leads the lines of type to an elevator I, Figs. 19, 20, and 22, consisting of a frame which slides in ways on the main frame and is provided with two prongs 212 213, one at each side of the runway 200. The elevator is operated periodically by a cam 214 upon the shaft P by means of connections consisting of a cam-lever 215 and link 216. The upper ends of the prongs 212 213 have shoulders 217, which engage with the lips of the temporary space-quads and carry them upward when they reach the elevator. The rear prong 213 of the elevator has a vertical slot 214 at its upper end, into which projects a toe 218 upon the arm of a vertical slide 219, Figs. 19, 22, 31, and 32. The slide 219 carries an arm 220, upon which is a vertical rack-rod 221, which engages a pinion 222 upon a shaft 223. Upon the shaft 223 is a pinion 224, which engages a rack 225, carrying a gage-hook 226. Upon the shaft 223 is also a gear 227, engaging a vertical rack 228, which carries a wedge or incline 229. Incline 229 engages a notch or shoulder in a gage-slide 230, the shoulder being always held against the incline by a spring 231. Another spring 232 tends to normally draw down the rack 228 and to return the shaft 223 and its connected slides to their normal positions. When a line-quad reaches the elevator, its lips fit over the upper ends of the prongs 212 213, and it is carried up on top of the elevator. As the elevator rises the lip of the quad which lies on top of the slot 214 engages the toe 218 and carries up the slide 219, thereby revolving the shaft 223 and causing the gage-hook 226 to retreat. A plunger 233, which will be presently described, then comes forward and pushes the line-quad in front of the gage-hook and from under the toe 218. The slides 221 and 228 are then drawn down by the spring 232 and the gage-hook moves over until it is stopped by the end of the line-quad. The quad is stopped by the extension $y'$ of the front plate $y$. (See Figs. 21 and 33.) Through the connections described the gage 230 is set to regulate the cutting of the spaces for the line represented by the line-quad.

From the above description it will be seen that the line-quads are carried higher by the elevator than the temporary space-quads. A common pusher 233, Fig. 23, operates when the elevator is raised to push the line-quad onto a platform 234 in front of the gage-hook or, if a space-quad be carried by the elevator, to push it into a channel 235, through which it will be returned to the temporary space-magazine 3. The pusher 233 is operated by rack 236, pinions 237 238, rack 239, link 240, elbow-lever 241, link 242, and cam-lever 243, which is spring-pressed upon cam 244 on the power-shaft.

When the elevator rises, a latch 245, Figs. 20, 22, and 23, springs up and closes the runway 200, thereby preventing the vibrating pawls from moving the balance of the line forward until the elevator is depressed. The latch is carried upward by a spring 246, Fig. 23, and as the elevator comes down its upper cross-bar $i$ engages a part 247 upon the latch and withdraws the latch from the runway.

The blanks K for the final spaces, which I will term the "space-timber," are each in the form of a hollow quad with the top and one side removed, as shown in Fig. 26. The remaining side 248 is equal in thickness to the minimum spaces which may be desired, and the bottom 249 and ends 250 are proportioned so that they may be readily cut, while at the same time they are strong enough to be used as space-quads in ordinary printing-forms. This space-timber is made, preferably, of type-metal. Fig. 26 shows a piece of space-timber as it is supplied from the magazine. The part containing the side wall 248 forms the space-quad, while the part cut off is scrap, which may be saved and cast into new timber. The space-timber is contained in a magazine L, from the lower end of which pieces are periodically ejected by a plunger 252, which is drawn forward by a spring 253 and retreated by a cam 254, both operating on the cam-lever 255. When a line-quad is carried up by the elevator, the plunger 252 is prevented from ejecting a piece of space-timber by means of a pawl 256, Figs. 15, 18, 19, and 33, which is pushed over by a projection 257 upon the gage-hook slide 225. The pawl 256 engages a shoulder 258 upon the plunger 252. This prevents the ejection of a piece of space-timber during one revolution of the cam 254, after which the pawl 256 is raised by a spring 259.

The space-timber is delivered from the magazine onto the end of a slide 260, Figs. 15 and 16, mounted in a bracket on the main frame. This slide is provided with a side wall 261 to prevent the space-pieces from being pushed too far. A second slide 262 is mounted on the slide 260, and a pin 263 upon slide 262 extends through a slot in the slide 260 and is connected to the latter slide by a spring 264. A second pin 265 on the slide 262 is connected by a link 266 with a spring-arm 267 upon the lever 243.

After a piece of space-timber is delivered to the slide 260 the spring-arm 267 moves forward, and the slides 260 262 carry the timber against the face of the gage 230, thus locating the timber in position to be severed to produce a word-space quad, as shown in Fig. 16. After the timber is in position against the gage it is clamped by a plunger 268, which is connected to a lever 269, Figs. 16 and 17, operated by cam 270 upon the power-shaft P through the medium of cam-lever 271 and link 272. The plunger is drawn down by a spring, Fig. 17, bearing upon the lever 271 and raised at the proper time by cam 270.

The cutting mechanism consists of a cutting-off tool 273 and a chisel 274, located, respectively, above and below the space-piece prior to the cutting operation, Figs. 16 and 20. The tool and chisel are carried upon a frame 275, which consists of two uprights joined by a cross-bar at their lower ends. Upon the cross-bar is a roll 276, which is engaged by a cam 277 upon the power-shaft P. This cam forces the tool down at the proper time, cutting the timber off roughly. Upon a further revolution of the cam a stout spring 278 raises the frame 275 and the chisel 274 trims the space smoothly, rendering it ready for insertion in the line. As shown, the chisel remains elevated while the space is being injected into the line, and for that reason the inner face of the chisel is cut away, as shown at 279, to prevent the friction of the space upon the chisel. After the space is cut a plunger 280 forces it endwise through an opening in the rear post 213 of the elevator into its proper place in the assembled line of type. The cutting-off tool is preferably made in the form shown in Fig. 20, having four cutting-points, which nearly sever the end walls of the blank, and shearing edges, which afterward cut the blank in two roughly. The plunger 280 is connected with a slide 281, which is operated in one direction by a cam 282 and in the other direction by means of a spring 283, through the medium of a cam-lever 284 and link 285.

The ejector-cam 254 and the elevator-cam 214 are connected together and are loose upon the power-shaft P, Figs. 19, 20, 21, and 23. Upon these cams is a shoulder 286, which is normally engaged by a pawl 287, carried by an arm 288, which is rigid upon the shaft P. The pawl is normally pressed into engagement with the spring 289, Fig. 20. If for any reason a space or line quad is not properly located on the elevator at the time it should rise, the bolt 290 is left thrown up, which trips the pawl 287, permitting it to pass the shoulder 286 and allowing the elevator and ejector cams to remain idle during the revolution of the power-shaft. In the same manner these cams will continue idle until a quad is in proper position to be elevated. The stoppage of these cams is effected by means of a lever 291, Fig. 21, the upper end of which is normally located between the upper ends of the elevator-posts and in the path of the projecting lips of the quads. The lower end of the lever 291 engages an arm 292 upon a shaft 293, and a second arm 294 upon this shaft is connected with the bolt 290. The bolt is normally withdrawn and the lever 291 normally held with its upper end in the path of the quads by means of a spring 295.

Recapitulation of movements: The various movements incident to removing the line and temporary space-quads and cutting and inserting the final quads are as follows: The lines of type provided with temporary quads and justifying line-quads are constantly forced through the runway to the elevator. When the elevator is down, the type are free to pass through it on their way to the galley. When a space-quad or line-quad arrives at the elevator, its ends which project beyond the type are intercepted by fingers 291. In advance of each line is its appropriate line-quad. As a line-quad is carried up by the elevator the space-gage hook is withdrawn. The quad is then pushed over in front of it, and the hook permitted to move up against the quad, thus setting the gage for the succeeding line. While these movements take place, the clutch of the galley-shaft is tripped and the preceding line is transferred to the galley. When a line-quad is elevated, the space-timber ejector is prevented from operating by the pawl 256. At the next revolution of the power-shaft a temporary word-space is carried up by the elevator and pushed off into the returning runway 235. During this revolution of the shaft a piece of space-timber is ejected from its magazine and moved against the gage. The space-timber is then clamped, after which the space is cut by the cutting-off tool and the chisel. The finished space is then released by the clamp and injected into the line through an opening in the rear post 213 of the elevator. While these movements take place, the elevator is lowered, and during the latter portion of the rotation of the power-shaft the feed-pawls advance the line to bring the next line-quad or temporary space to the elevator. As heretofore stated, if a space-quad is not properly located over the elevator at the time the latter should rise the elevator and the space-timber ejector will be thrown out of action and no space will be cut until the succeeding rotation.

*Transfer of lines to galley.*—The various movements necessary to transfer the completed lines of type to the galley are obtained from a short movement-shaft J, Fig. 19. In line with this shaft there is a constantly-running gear 301, which, as shown, meshes with a pinion 302 upon the power-shaft. Upon the face of the gear 301 is a crown ratchet-wheel 303, and pivoted in the shaft J is a pawl 304. The ratchet 303 and pawl 304 constitute a clutch M, which when thrown into gear rotates the shaft J through one revolution. The clutch M is similar in construction and operation to the clutches F and H, heretofore described. When the end of a line is reached and a line-quad is carried up on the elevator the upward movement of the bar 219 operates a lever 305, which draws down a stop-latch 306, trips the pawl 304, and engages the shaft J with the rotating sleeve 300 during a single revolution. As the movement-shaft J starts, an arm 308, Figs. 23 and 31, is drawn to the right by means of a link 309, acted upon by a cam 310. The arm 308 carries a pivoted hook 311, which is normally pressed into the runway 200 by a spring 312, but which in its rearmost position is held below the runway by a stop 300. When the shaft J is operated, the first movement of the shaft causes the hook 311 to engage and draw the completed line of type from the elevator into position opposite the galley N. Upon further movement of the shaft J the line is transferred to the galley by means of a plunger 313, Figs. 18, 19, and 22, carried by racks 314, which are operated by gears 315 upon a shaft 316, which is rotated by a pinion 317 and rack 318, said rack carrying a roll 319, which travels on the cam 320 upon the shaft J.

The galley N is arranged in a nearly vertical position, and the lines of type are sustained in it upon a bracket 321, which is carried by a slide 322, moving with considerable frictional resistance in a groove 323 at one side of the galley. After a line of type is transferred to the upper end of the galley the column is moved down to make room for the succeeding line by the transverse bar 324, carried by links 325, connected to arms 326 upon rock-shaft 327, which is rocked at each rotation of the shaft J by a cam-lever 328 and cam 329. The galley is removable, and to permit of its removal the bracket 321 is pivotally connected to the slide 322, so that it may be swung around out of the way when the galley is loaded. If it is desired to produce leaded matter, a magazine O of leads is located above the galley, with its lower end in the path of the plunger 313, as shown in Figs. 18 and 21. The leads are sustained by lips 321, having an opening between them, through which a plunger may pass, and the plunger is just high enough to engage and push out one lead at a time, which falls on top of the line of type and is transferred with the line to the galley.

*Mechanism for returning temporary space-quads to their magazine.*—The temporary space-quads are ejected from the elevator by plunger 233 into a runway 235, Figs. 2, 22, 27, and 28, through which they are transferred to a receiving-magazine 331, adjacent to their magazine 3. In the upper part of the runway 235 there are a number of retaining-pawls 332, which permit the quads to pass and prevent any backward movement. Beneath the runway there is a sliding rod 333, carrying a series of spring pushing-pawls 334. The quads are fed into the runway 235 by the plunger 233 in succession, and when the head of the line reaches the first of the conveyer-pawls 334 the quads are taken up singly and carried by the conveyers through the runway to the receiving-magazine 331. The bar 333 is reciprocated by the lever 243 and its connection, which have been previously described, a pin 335 on the bar engaging a fork 336 upon the upper end of the lever. As the rod 333 reciprocates, an incline 337 upon its lower side strikes one end of a lever 338, rocking a shaft 339. The opposite end of lever 338 carries an elevator 340, which rises and forces up the entire column of quads in the receiving-magazine 331, and the quads are retained in an elevated position by spring-pawls 341. When the elevator recedes, a new space is forced onto it and then forced up into the column.

To an arm 342 on shaft 339 there is connected a link 343, the upper end of which is connected to an arm 344 on a rock-shaft 345, Figs. 2, 3, 27, and 28. When the shaft is rocked, a second arm 346 draws back a slide 347, which is under tension to move forward by means of the spring 348. A pushing-pawl 349 is pivoted to the slide, and each time the slide is drawn forward by the spring the pawl pushes a quad from the receiving-magazine into the quad-magazine 3, provided the latter magazine is not full. If the magazine 3 is filled with quads up to the level of the pawl 349, the pawl is rendered inoperative, as no further quads can be transferred until the level of the quads in the magazine 3 is lowered. New quads arriving in the meantime are simply forced into the magazine 331, and the column in that magazine temporarily reaches a higher level than that of the pawl 349.

The line-quads are forced past the gage-hook 226 in a continuous line and up the incline surface 234 until they reach a chute 350, from which they are discharged by gravity through an opening 351 in the front of the machine into a suitable receptacle.

The operation of the entire machine has been explained in connection with the description of the several parts and a brief summary will suffice. The lower-case type are ejected onto the runway and transferred to the stick by a single movement of the reciprocating carrier 34. The upper-case type are moved by the right-hand carrier 34 to the middle of the runway and are then taken by the left-hand carrier to the stick. The hook 100 takes each individual type from the carrier and moves it a short distance into the stick, thereby relieving the carrier from the strain which it would suffer if it were required to move all of the type in the stick each time a type is assembled. The temporary spaces are transferred to the stick in the same way that the lower-case type are transferred. The scale registers the aggregate width of the type plus normal spaces, and it is therefore easy to judge when sufficient matter has been assembled for a line. While the line is being assembled the wedge-piece is rotated one step for each word-space in the line, and when the line is finished the proper wedge to control the justification of the line is opposite the gage-slide 146. When a line of matter has been assembled in the stick, the line-key is depressed. Following this the pawl 128 immediately moves the assembled type along the stick until they pass the compacting-pawl 129. This clears the right end of the stick, so that there will be ample space for the first few type of the next line and there need be no delay in beginning it. While the pawl 128 is in operation, a line-quad is ejected onto the elevator 151. Next the wedge-shaft is released, and it descends until it is intercepted by the compacting-pawl, which is limited by the length of the line in the stick, the compacting-pawl being connected with the wedge-piece, as best shown in Fig. 11. The movement of the compacting-pawl is always in proportion to the unfilled space in the line—that is, in proportion to the amount of space to be occupied by the final justifying-quads. Each time a temporary space is introduced the stick is lengthened by the amount of its width. Hence the number of temporary word-spaces does not affect the movement of the pawl 129. As the wedge-piece descends, the selected wedge moves the gage-slide and adjusts the line-quad in position to have the proper amount cut off by the chisel 161, Fig. 11. The chisel is then operated and the line-quad is cut off in proportion to the width of the final spaces and made suitable to control the formation or cutting of the final spaces. The line and its appropriate line-quads are then ejected into the runway together and transferred to the spacing mechanism.

The operations above outlined may be carried on in a machine which is distinct and separate from the spacing-machine. I prefer, however, to combine the machines and provide means for transferring the lines with their line-quads to the spacing-machine and for returning the temporary spaces to their magazine. As the line travels to the spacing-machine its line-quad is in advance and is taken up by the elevator and utilized to set the gage 230 for the final spaces. The gage-hook and the gage are operated by the rack 221, which is connected to the finger 218, the finger being raised by the line-quad. When a line-quad is raised, the plunger, which ejects the pieces of timber for the final spaces, is locked and no timber is ejected. The line then moves forward, the type for the first word passing through the elevator until the first temporary space-quad reaches the elevator. The latter then rises and carries the quad up to a position opposite the runway 235, and it is injected into said runway. While a temporary space is being raised and forced into its return-runway, a piece of space-timber is ejected from its magazine, placed in position against the gage 230, clamped in said position, and then reduced to the proper size by the cutting-off tool and chisel. After the space is cut it is ejected into the line in place of the temporary space which was removed. The elevator then descends, and the line of type moves forward until the second temporary space reaches the elevator, when the above cycle of operations is repeated. After the final spaces have been inserted in a line the line-quad of the succeeding line reaches the elevator, the gage-hook is again drawn back, the line-quad is forced into the position in front of the hook occupied by the preceding line-quad, and the gage is reset as the hook moves up against the line-quad. As the finger 218 is raised it carries up the slide 219, and through the connections described the clutch of the galley-movement shaft is tripped, and that shaft makes one revolution, the effect of which is to transfer the previously-spaced line to a position in front of the galley, then to move it into the galley, and finally to depress the line in the galley to make room for the succeeding line. If the lead-magazine be supplied with leads, one will be carried into the galley with each line of type.

The particular devices and mechanisms described serve to illustrate one form in which the main features of my invention may be embodied. I may, however, make considerable changes and alterations in the details of the mechanism by substituting equivalent devices without exceeding the scope of the invention in its broader aspect. My invention is, therefore, not limited to the particular mechanism illustrated and described.

What I claim is—

1. In a justifying mechanism for composing-machines, a wedge-piece consisting of a series of wedges upon a common support in combination with means for selecting any desired wedge and rendering said wedge operative to control the justification of a line, substantially as described.

2. In a justifying mechanism for composing-machines, a wedge-piece consisting of a series of wedges upon a common support, said support being movable in one direction to select any desired wedge and movable in another direction to bring the selected wedge into action, substantially as described.

3. In a justifying mechanism for composing-machines, a wedge-piece consisting of a series of radially-arranged wedges upon a common shaft or support, said shaft being rotatable to select any desired wedge and movable longitudinally to bring the selected wedge into action, substantially as described.

4. In a justifying mechanism for composing-machines, a wedge-piece provided with a series of wedges and capable of two movements, means for imparting one movement corresponding to the number of word-spaces in a line and adapted to select the proper wedge for the justification of the line, and means for imparting the other movement lengthwise of the wedges and in proportion to the unfilled measure of said line, substantially as described.

5. The combination in a type-setting machine, of the wedge-piece provided with a series of wedges, means for assembling a line of type upon a stick, means for moving the wedge-piece in a plane at right angles to the wedges and in proportion to the word-spaces in a line to select the proper wedge, a compacting device for compacting the line of type upon the stick and connections between said compacting device and the wedge-piece whereby the limiting of the movement of said device by the line of type also limits the longitudinal movement of the selected wedge, substantially as described.

6. In a type-setting machine, the combination with a stick and means for assembling a line of type thereon, a wedge-piece consisting of a rotatable shaft provided with a series of radially-arranged wedges, a word-space key and connections between said key and the shaft of the wedge-piece whereby said wedge-piece is rotated to bring a new wedge into operative position each time a space is selected, the compacting device for the line of type and connections between said device and the wedge-piece whereby the latter is moved longitudinally in proportion to the unfilled space in the line, substantially as described.

7. In a type-setting machine, the combination with the stick and means for assembling a line of type and temporary spaces upon the stick, of a vertically-movable wedge-piece provided with a series of wedges, a word-space key and connections between said key and the wedge-piece whereby a new wedge is brought into operative position for each word-space, means for lowering the wedge-piece after a line is assembled, a compacting device carried by a sliding rack, a rack movable vertically with the wedge-piece, and connections between said racks whereby the downward movement of the wedge-piece serves to compact the line, substantially as described.

8. In a type-setting machine, the combination with a magazine and a stick and means for assembling type and temporary spaces upon the stick, of a scale, a pointer for indicating upon the scale, and means operating independently of the spaces for causing the pointer to register an arbitrary amount upon the scale each time a temporary space is added to the line, substantially as described.

9. In a type-setting machine, the combination with a magazine and a stick, and means for assembling type and temporary spaces upon the stick, of a scale, a pointer for indicating upon the scale, and means operating independently of the spaces for causing the pointer to register a normal space upon the scale when a temporary space is added to the line, substantially as described.

10. In a type-setting machine, the combination with a magazine and a stick, of means for assembling type and temporary spaces upon the stick, a movable scale having a connection which is carried forward by the accumulating type upon the stick, an indicator for the scale, and means for moving the indicator forward a less amount than the scale each time a temporary space is added to the line, whereby an amount less than said temporary space is registered by the indicator, substantially as described.

11. In a type-setting machine, the combination with a magazine and a stick, of means for assembling type and spaces upon the stick, a movable scale having a head overlying the stick and in the path of the type whereby the movements of the scale are in proportion to the widths of type assembled, means for holding the scale-head against the type in the stick, and a pointer for indicating upon the scale the amount of type in the stick, substantially as described.

12. In a type-setting machine, the combination with a magazine and a stick, of means for assembling the type and temporary spaces upon the stick, a sliding scale having a head adapted to travel in advance of the accumulating type upon the stick, a weight tending to draw the scale in the opposite direction, a ratchet-bar and means for moving said bar each time the space-key is operated, and a pointer carried by said ratchet-bar and located adjacent to the sliding scale, substantially as described.

13. In a type-setting machine, the combination of a magazine and a stick and means for assembling type and temporary spaces upon the stick, of a movable abutment upon said stick for gaging the length of line, a wedge-piece provided with a series of wedges and capable of movement to bring the different wedges into action, a space-key, and connections between said space-key and the abutment and wedge-piece whereby the abutment is retreated to lengthen the stick and the wedge-piece is moved to bring a new wedge into operative position each time the space-key is operated, substantially as described.

14. In a type-setting machine, the combination with a magazine and a stick and means for assembling type and temporary spaces upon the stick, of a movable abutment forming one end of the stick, means for retreating said abutment to lengthen the stick each time a space is added to the line-compacting mechanism, and a locking device for locking the abutment when the line is assembled, whereby the abutment is rendered immovable when the line is compacted against it, substantially as described.

15. In a type-setting machine, the combination with the magazine consisting of two sections, of a runway adjacent to the magazine, means for ejecting the type from the magazine into the runway, and two reciprocating conveyer-fingers operating in the runway, one in front of each section of the magazine, one conveyer-finger being adapted to transfer type directly to the stick, and the second conveyer-finger being arranged to transfer its type to the first conveyer-finger, substantially as described.

16. In a type-setting machine, the combination with a magazine consisting of two sections in line with each other, of a runway adjacent to the magazine, means for ejecting type from the magazine into the runway and a pair of conveyer-fingers connected to a common reciprocating part, said conveyer-fingers extending into the runway and engaging the type during their forward movement and being automatically withdrawn from the runway during their backward movement, substantially as described.

17. In a type-setting machine, the combination with a runway, of a slide adapted to move in guides parallel with the runway, a type-conveyer finger pivoted on said slide and adapted during its forward movement to travel in the runway, a reciprocating part and an arm on said conveyer-finger connected with said part, whereby the slide and conveyer-finger are reciprocated bodily and the conveyer-finger receives an independent movement into and out of the runway, substantially as described.

18. The combination of the runway, the slides movable in guides parallel with the runway, the conveyer-fingers pivoted on the slides, the band to which the conveyer-fingers are connected, the reciprocating carriage and pulleys upon which said band is mounted, and means for holding a part of the band opposite the conveyer-fingers stationary, substantially as described.

19. In a type-setting machine, the combination with a magazine arranged in two sections for upper and lower case letters respectively, of pushers for ejecting the type, a reciprocating bar common to the pushers, lifting-rods connected with the type-keys and arranged to engage the pushers with the reciprocating bar, and means for throwing the rods corresponding to either section of the magazine out of operative position, substantially as described.

20. In a type-setting machine, the combination with a type-magazine, a series of pushers arranged to discharge the type from the magazine, a runway for receiving said type, a power-shaft, an escape-shaft, a laterally-movable bar operated from the escape-shaft, finger-keys and connections arranged to engage the pushers with the bar, and means for starting the escape-shaft after a pusher is engaged with said bar, substantially as described.

21. In a type-setting machine, the combination with the magazine having two sections for upper and lower case type respectively, pushers for ejecting the type from the magazine, the bar reciprocating laterally adjacent to the pushers, lifting-rods for engaging the pushers with the reciprocating bar, the bank of finger-keys, and two sets of levers connecting said keys respectively with the rods for the upper and lower case characters corresponding with the keys, substantially as described.

22. A justifying line-quad having one of its dimensions proportioned to the width of the final spaces necessary to justify a line and adapted to control the justification of the line, substantially as described.

23. In a type-setting machine, means for assembling a line of type and temporary word-spaces, in combination with means for preparing a justifying line-quad which is adapted to control the justification of the line, substantially as described.

24. The combination with means for assembling lines of type and temporary word-spaces, of a magazine of line-quad blanks of uniform size and automatic means for cutting said blanks to different sizes to adapt them to control the justification of different lines, substantially as described.

25. The combination with means for assembling lines of type and temporary word-spaces, of blanks or timber for line-justifying quads, means, such as the wedge-piece, for gaging the lengths, of justifying-quads for respective lines, and means for cutting off or forming said blanks into justifying line-quads, substantially as described.

26. The combination with means for assembling type and temporary spaces in lines, of a wedge-piece provided with a series of wedges, means for selecting the proper wedge and rendering operative a proper portion of said wedge as a gage for the justification of each line, a magazine of line-quad timber, and means for preparing justifying line-quads for different lines, said means being controlled by the points rendered operative upon the wedge-piece for the respective lines, substantially as described.

27. In a type-setting machine the combination with the magazine and means for assembling a line of type and temporary spaces, of the wedge-piece capable of two movements respectively in accordance with the number of word-spaces and the amount of unfilled space in a line, the line-quad blanks or timber, the knife for cutting said blanks to form justifying-quads, and the means controlled by the wedge-piece for gaging the lengths of said justifying line-quads, substantially as described.

28. The combination with the line-quad magazine, of means for ejecting a quad from the magazine, a knife for severing the quad, and means for automatically gaging the amount to be removed from the blank to form a justifying line-quad, substantially as described.

29. The combination with the line-quad magazine, the ejector for said magazine, the knife for cutting the quads, the wedge-piece for gaging the amount to be removed, a cam-shaft and connections for operating all of said parts, said shaft being normally at rest, and a starting-key whereby the shaft may be started at the end of each line, substantially as described.

30. In a type-setting machine, the combination with a magazine and a stick, and means for assembling type and temporary spaces upon the stick, of means for preparing a justifying line-quad and devices for transferring the lines from the stick and assembling the justifying line-quads with their respective lines, substantially as described.

31. The combination with the stick, of a runway into which the assembled lines are to be transferred, an elevator adjacent to the stick, a type-hook for transferring the lines to the elevator, and means for moving the elevator to bring the line opposite the runway, and a finger for moving the line into the runway, substantially as described.

32. In a type-setting machine, the combination with means for feeding forward a line of type and temporary spaces with relation to space-forming mechanism, of mechanism for forming final word-spaces for the line and for removing the temporary spaces and inserting said final spaces in lieu thereof, substantially as described.

33. In a type-setting machine, the combination with means for composing a line of type and temporary spaces, of a magazine provided with word-space blanks, means for cutting said blanks for forming final spaces for the justified line, and means for inserting the final spaces in lieu of the temporary quads, substantially as described.

34. In a type-setting machine, the combination with means for composing a line of type and temporary quads, of means for removing said quads from the line successively, and means for cutting final justifying-spaces and inserting them in said line successively in lieu of the temporary spaces, substantially as described.

35. In a type-setting machine, the combination with means for assembling a line of type and temporary spaces and means for preparing a line-justifying quad adapted as a gage for the final word-spaces of the line, of mechanism for forming final spaces and substituting them in the line for the temporary spaces, said mechanism being controlled by the line-justifying quad, substantially as described.

36. The combination in a type-setting machine, of means for composing a line of type and temporary quads, means for preparing a line-justifying quad, means controlled by said line-quad for forming final spaces and inserting them in the line in lieu of the temporary quads, a galley and devices for transferring the line to the galley, substantially as described.

37. In a type setting and justifying machine, mechanism for preparing justifying word-spaces consisting of space-timber or blanks, a magazine therefor, means for ejecting the blanks from the magazine, a cutting device for trimming the blanks to the proper size, and means for gaging the amount to be removed by the cutting device, substantially as described.

38. The described blank or space-timber, the same being hollow and angular in cross-section and provided with thin rectangular ends, substantially as described.

39. The cutting device for trimming the space-timber, the same consisting of a reciprocating frame and a cutting-off tool and chisel carried by said frame, and adapted respectively to sever the blank and trim the face of the quad, substantially as described.

40. The combination with two parallel ratchet-bars having differently-spaced teeth, of a moving pawl common to both ratchets and having a range of movement less than the length of the longer teeth, and means for starting the ratchet having the longer teeth, whereby the moving pawl is permitted to engage and move both ratchets, the movement of each ratchet being proportioned to the length of its teeth, substantially as described.

41. In a type-setting machine, the combination with the carrier-finger for moving the type from the magazine to the stick, of the intermediate hook 100, and the holding-pawl 47, said hook being adapted to receive the type from the reciprocating finger and transfer it to the holding-pawl, substantially as described.

42. In a type-setting machine, the combination with a magazine having sections for upper and lower case type, of a pair of carriers for conveying the type from the magazine, one of said carriers being adapted to reciprocate opposite each section, a keyboard, means for reciprocating the carriers each time a key is depressed, an upper-case key, and means for giving the carriers an extra reciprocation as the upper-case key is released, substantially as described.

In testimony whereof I affix my signature in presence of two witnesses.

FRANK AMOS JOHNSON.

Witnesses:
 J. A. WATSON,
 W. CLARENCE DUVALL.